United States Patent
Rahman et al.

(10) Patent No.: US 10,075,218 B2
(45) Date of Patent: Sep. 11, 2018

(54) METHOD AND APPARATUS FOR FD-MIMO BASED MULTICASTING IN VEHICULAR COMMUNICATION SYSTEMS

(71) Applicant: Samsung Electronics Co., Ltd, Suwon-si (KR)

(72) Inventors: Md. Saifur Rahman, Plano, TX (US); Sridhar Rajagopal, Plano, TX (US); Eko Onggosanusi, Coppell, TX (US); Thomas David Novlan, Dallas, TX (US); Aris Papasakellariou, Houston, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 15/339,756

(22) Filed: Oct. 31, 2016

(65) Prior Publication Data

US 2017/0134080 A1    May 11, 2017

Related U.S. Application Data

(60) Provisional application No. 62/251,358, filed on Nov. 5, 2015, provisional application No. 62/316,978, filed on
(Continued)

(51) Int. Cl.
*H04L 1/02* (2006.01)
*H04B 7/0456* (2017.01)
(Continued)

(52) U.S. Cl.
CPC ........ *H04B 7/0456* (2013.01); *H04W 72/042* (2013.01); *H04W 84/005* (2013.01); *H04W 84/18* (2013.01)

(58) Field of Classification Search
CPC ....... H04L 1/0618; H04L 1/06; H04L 5/0051; H04L 5/0053; H04B 7/0456; H04B 7/0619; H04B 7/0452
(Continued)

(56) References Cited

U.S. PATENT DOCUMENTS

2010/0273499 A1 * 10/2010 van Rensburg ... H04W 72/1231
  455/450
2010/0284484 A1    11/2010 Jongren et al.
(Continued)

FOREIGN PATENT DOCUMENTS

WO    2015080471 A1    6/2015

OTHER PUBLICATIONS

ETSI TS 136 213 V13.1.1 (May 2016) LTE; Evolved Universal Terrestrial Radio Access (E-UTRA); Physical Layer Procedures (3GPP TS 36.213 version 13.1.1 Release 13)—363 Pages.
(Continued)

*Primary Examiner* — Khai Tran

(57) ABSTRACT

A method for user equipment (UE) in a wireless communication network. The method comprises identifying a plurality of beams for a semi-open-loop PDSCH data transmission based on at least one of a plurality of precoder cycling types, wherein a precoder comprises a beam and a co-phase, and the plurality of precoder cycling types including at least one of a beam cycling from the plurality of beams or a co-phase cycling from a plurality of co-phases, receiving PDSCH data through the semi-open-loop PDSCH data transmission according to the at least one of the plurality of precoder cycling types, and identifying the plurality of beams based on the at least one of the plurality of precoder cycling types, wherein the precoder comprising the beam and co-phase, and the plurality of precoder cycling types is cycled across a plurality of resource blocks (RBs) using the at least one of
(Continued)

the beam cycling or the co-phase cycling with at least one of a cycling period or granularity from at least one of a plurality of cycling periods or granularities including at least one of a single resource element (RE), a single RB, multiple REs, or multiple RBs.

20 Claims, 23 Drawing Sheets

Related U.S. Application Data on Apr. 1, 2016, provisional application No. 62/355,061, filed on Jun. 27, 2016, provisional application No. 62/364,434, filed on Jul. 20, 2016, provisional application No. 62/385,034, filed on Sep. 8, 2016.

(51) Int. Cl.
*H04W 72/04* (2009.01)
*H04W 84/00* (2009.01)
*H04W 84/18* (2009.01)

(58) Field of Classification Search
USPC .................. 375/267, 260, 347, 348; 370/329
See application file for complete search history.

(56) References Cited

U.S. PATENT DOCUMENTS

| | | | |
|---|---|---|---|
| 2011/0216846 A1 | 9/2011 | Lee et al. | |
| 2012/0207243 A1 | 8/2012 | Koivisto et al. | |
| 2015/0163783 A1* | 6/2015 | Kim | H04W 72/0406 370/329 |
| 2016/0135180 A1* | 5/2016 | Yuan | H04B 7/0617 370/329 |
| 2016/0212750 A1* | 7/2016 | Xu | H04B 7/0456 |
| 2016/0366673 A1* | 12/2016 | Seo | H04L 5/0023 |

OTHER PUBLICATIONS

3GPP TS 36.321 v13.1.0 (Mar. 2016) 3rd Generation Partnership Project; Technical Specification Group Radio Access Network; Evolved Universal Terrestrial Radio Access (E-UTRA); Medium Access Control (MAC) protocol specification (Release 13)—85 Pages.
3GPP TS 36.331 V13.1.0 (Mar. 2016) 3rd Generation Partnership Project; Technical Specification Group Radio Access Network; Evolved Universal Terrestrial Radio Access (E-UTRA); Radio Resource Control (RRC); Protocol specification (Release 13)—551 Pages.
ETSI TS 136 212 V13.0.0 (Jan. 2016) LTE; Evolved Universal Terrestrial Radio Access (E-UTRA); Multiplexing and channel coding (3GPP TS 36.212 version 13.0.0 Release 13)—123 Pages.
3GPP TSG RAN WG1 Meeting #84 R1-160646; St Julian's, Malta, 17.3.3.2.3; LG Electronics Discussion on potential enhancement areas for multi-cell multicast/broadcast Document for: Discussion and Decision; Feb. 5-19, 2016—Pages 6.
3GPP TSG-RAN WG2 #92 R2-155002; LG Electronics (Rapporteur); LG Electronics (Rapporteur); Anaheim, CA, USA, Nov. 16-20, 2015—6 pages.
3GPP TSG RAN Meeting #71 RP-160623; SAMSUNG; New WID Proposal: Enhancements on Full-Dimension (FD) MIMO for LTE Document for: Approval Göteborg, Sweden, Mar. 7-10, 2016—8 Pages.
"FD-MIMO Codebook Structure, Design Features, and Dimensioning," 3GPP TSG-RAN WG1#82, R1-154557, Beijing, China, Aug. 24-28, 2015, 10 pages.
Foreign Communication From a Related Counterpart Application, PCT Application No. PCT/KR2016/012736, International Search Report dated Feb. 10, 2017, 3 pages.

* cited by examiner

| Codebook-Config | Beam Group | Number of beams (L1,L2) |
|---|---|---|
| 1 | | (1,1) |
| 2 | | (2,2) |
| 3 | | (4,2) |
| 4 | | (4,1) |

FIG. 24

| Codebook-Config | L = 1 beam | L = 2 beams | L = 4 beams | L = 8 beams |
|---|---|---|---|---|
| 2 | | | | |
| 3 | | | | |
| 4 | | | | |

FIG. 25

METHOD AND APPARATUS FOR FD-MIMO BASED MULTICASTING IN VEHICULAR COMMUNICATION SYSTEMS

CROSS-REFERENCE TO RELATED APPLICATION(S) AND CLAIM OF PRIORITY

This application claims priority under 35 U.S.C. § 119(e) to:
U.S. Provisional Patent Application No. 62/251,358 filed on Nov. 5, 2015 entitled METHOD AND APPARATUS FOR MULTICASTING IN VEHICULAR COMMUNICATION SYSTEMS;
U.S. Provisional Patent Application No. 62/316,978 filed on Apr. 1, 2016 entitled METHODS AND APPARATUS FOR FD-MIMO BASED MULTICASTING IN VEHICULAR COMMUNICATION SYSTEMS;
U.S. Provisional Patent Application No. 62/355,061 filed on Jun. 27, 2016 entitled METHODS AND APPARATUS FOR FD-MIMO BASED MULTICASTING IN VEHICULAR COMMUNICATION SYSTEMS;
U.S. Provisional Patent Application No. 62/364,434 filed on Jul. 20, 2016 entitled METHODS AND APPARATUS FOR FD-MIMO BASED MULTICASTING IN VEHICULAR COMMUNICATION SYSTEMS; and
U.S. Provisional Patent Application No. 62/385,034 filed on Sep. 8, 2016 entitled METHODS AND APPARATUS FOR FD-MIMO BASED MULTICASTING IN VEHICULAR COMMUNICATION SYSTEMS.
The above-identified provisional patent applications are hereby incorporated by reference in their entirety.

TECHNICAL FIELD

This disclosure relates generally to wireless communication systems. More specifically, this disclosure relates to method and apparatus for FD-MIMO based PDSCH transmission in high-mobility scenarios such as vehicular communication system.

BACKGROUND

Traditionally, cellular communication networks have been designed to establish wireless communication links between mobile devices and fixed communication infrastructure components (such as base stations or access points) that serve users in a wide or local geographic range. However, a wireless network can also be implemented to utilize only device-to-device (D2D) communication links without a need for fixed infrastructure components. This type of network is typically referred to as an ad-hoc network. A hybrid communication network can support devices that connect both to fixed infrastructure components and to other D2D-enabled devices. While end user devices such as smartphones may be envisioned for D2D communication networks, a vehicular communication network, such as vehicle to everything (V2X) may be supported by a communication protocol where vehicles exchange control and data information between other vehicles (vehicle to vehicle (V2V)) or other infrastructure (vehicle to infrastructure (V2I)) and end-user devices (vehicle to pedestrian (V2P)). Multiple types of communication links may be supported by nodes providing V2X communication in a network, and utilizing the same or different protocols and systems.

SUMMARY

This disclosure provides a method and apparatus for FD-MIMO based PDSCH transmission in high-mobility scenarios such as vehicular communication system and for resource collision avoidance in vehicle to vehicle communication.

In one embodiment, a user equipment (UE) in a wireless communication network is provided. The UE comprises at least one processor configured to identify a plurality of beams for a semi-open-loop PDSCH data transmission based on at least one of a plurality of precoder cycling types, wherein a precoder comprises a beam and a co-phase, and the plurality of precoder cycling types including at least one of a beam cycling from the plurality of beams or a co-phase cycling from a plurality of co-phases. The UE further comprises a transceiver configured to receive PDSCH data through the semi-open-loop PDSCH data transmission according to the at least one of the plurality of precoder cycling types, wherein the at least one processor is further configured to identify the plurality of beams based on the at least one of the plurality of precoder cycling types, and wherein the precoder comprising the beam and co-phase, and the plurality of precoder cycling types is cycled across a plurality of resource blocks (RBs) using the at least one of the beam cycling or the co-phase cycling with at least one of a cycling period or granularity from at least one of a plurality of cycling periods or granularities including at least one of a single resource element (RE), a single RB, multiple REs, or multiple RBs.

In another embodiment, an eNodeB (eNB) in a wireless communication network is provided. The eNB comprises at least one processor configured to identify a plurality of beams for a semi-open-loop PDSCH data transmission based on at least one of a plurality of precoder cycling types, wherein a precoder comprises a beam and a co-phase, and the plurality of precoder cycling types including at least one of a beam cycling from the plurality of beams or a co-phase cycling from a plurality of co-phases. The eNB further comprises a transceiver configured to transmit PDSCH data through the semi-open-loop PDSCH data transmission according to the at least one of the plurality of precoder cycling types, wherein the at least one processor is further configured to identify the plurality of beams based on the at least one of the plurality of precoder cycling types, and wherein the precoder comprising the beam and co-phase, and the plurality of precoder cycling types is cycled across a plurality of resource blocks (RBs) using the at least one of the beam cycling or the co-phase cycling with at least one of a cycling period or granularity from at least one of a plurality of cycling periods or granularities including at least one of a single resource element (RE), a single RB, multiple REs, or multiple RBs. The eNB further comprises the transceiver configured to receive channel state information (CSI) including the plurality of beams for the semi-open-loop PDSCH data transmission.

In yet another embodiment, a method for user equipment (UE) in a wireless communication network is provided. The method comprises identifying a plurality of beams for a semi-open-loop PDSCH data transmission based on at least one of a plurality of precoder cycling types, wherein a precoder comprises a beam and a co-phase, and the plurality of precoder cycling types including at least one of a beam cycling from the plurality of beams or a co-phase cycling from a plurality of co-phases, receiving PDSCH data through the semi-open-loop PDSCH data transmission according to the at least one of the plurality of precoder cycling types, and identifying the plurality of beams based on the at least one of the plurality of precoder cycling types, wherein the precoder comprising the beam and co-phase, and the plurality of precoder cycling types is cycled across a plurality of resource blocks (RBs) using the at least one of the beam cycling or the co-phase cycling with at least one of a cycling period or granularity from at least one of a plurality of cycling periods or granularities including at least one of a single resource element (RE), a single RB, multiple REs, or multiple RBs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 24 illustrates beam grouping based on Codebook-Config. parameters; and

FIG. 25 illustrates Codebook-Config to beam group mapping for L=1, 2, 3, 4.

DETAILED DESCRIPTION

FIGS. 1 through 25, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The following documents and standards descriptions are hereby incorporated by reference into the present disclosure as if fully set forth herein: 3GPP TS 36.211 v13.1.1, "E-UTRA, Physical channels and modulation" (REF 1); 3GPP TS 36.212 v13.0.0, "E-UTRA, Multiplexing and Channel coding" (REF 2); 3GPP TS 36.213 v13.1.1, "E-UTRA, Physical Layer Procedures" (REF 3); 3GPP TS 36.321 v13.1.0, "E-UTRA, Medium Access Control (MAC) protocol specification" (REF 4); 3GPP TS36.331 v13.1.0, "E-UTRA, Radio Resource Control (RRC) protocol specification" (REF 5); 3GPP R2-155002, "Email discussion—[91bis#06][LTE/V2X] Capture agreements in TP" (REF 6); 3GPP R1-160646, "Discussion on potential enhancement areas for multi-cell multicast/broadcast" (REF 7); and 3GPP RP-160623, "New WID Proposal: Enhancements on Full-Dimension (FD) MIMO for LTE" (REF 8).

The descriptions of FIGS. 1-25 are not meant to imply physical or architectural limitations to the manner in which different embodiments may be implemented. Different embodiments of the present disclosure may be implemented in any suitably-arranged communications system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System' or 'New Radio Access Technology (NR)'.

The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Figure 1:
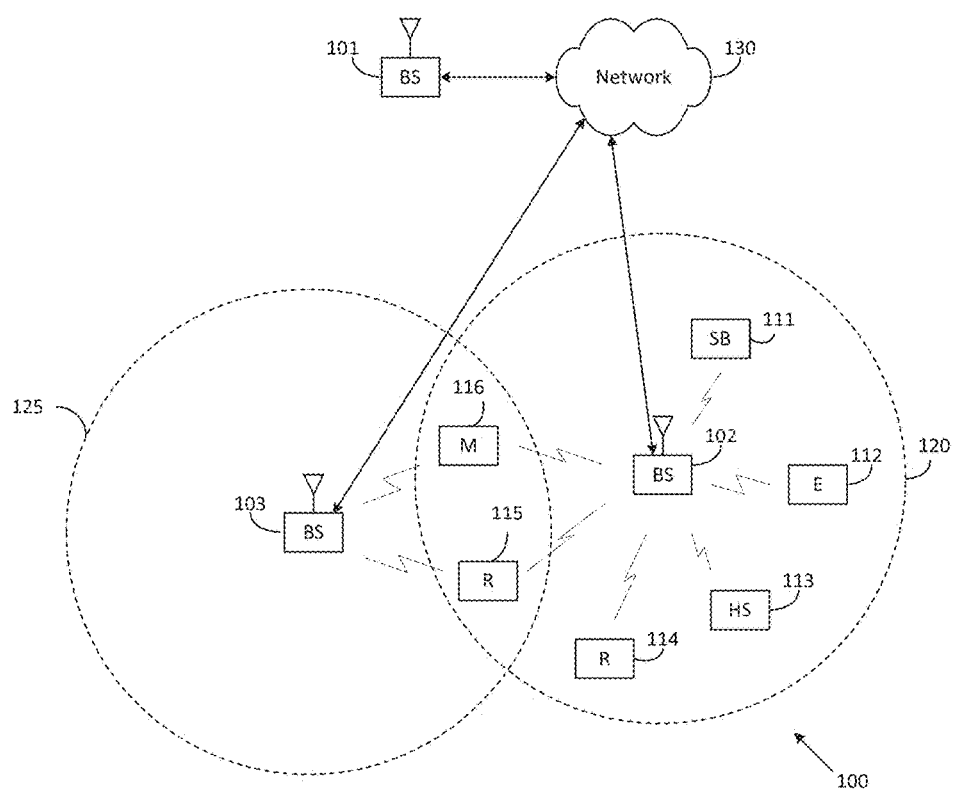
FIG. 1 illustrates an example wireless network according to embodiments of the present disclosure.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of UEs within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE-A, WiMAX, WiFi, LTE-U (LAA), device-to device (D2D), vehicle communication (V2X) such as vehicle-to-device (V2P), vehicle-to-infrastructure (V2I), vehicle-to-vehicle (V2V), or other wireless communication techniques. In one embodiment, the BSs 101-103 may be implemented as managing entities that control the UEs 111-116 (such as vehicle terminals).

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Depending on the network type, other well-known terms may be used instead of "eNodeB" or "eNB," such as "base station", "managing entity", "managing network entity", or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," "vehicle" or "user device." For the sake of convenience, the terms "user equipment" and "UE" are used in this patent document to refer to remote wireless equipment that wirelessly accesses an eNB (such as base station), whether the UE is a mobile device (such as a vehicle terminal, a mobile telephone, or smartphone) or is normally considered a stationary device (such as a desktop computer, or vending machine).

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 (such as a vehicle with a wireless communication interface, also may be termed as vehicle UE) include circuitry, programming, or a combination thereof, for processing of the control information, also known as scheduling assignment (SA) information and data transmission for collision avoidance in a wireless communication network (e.g., vehicle to vehicle (V2V) communication network). In certain embodiments, and one or more of the BSs 101-103 (e.g., eNB, E-UTRAN) includes circuitry, programming, or a combination thereof, for determining a set of SA information each of which includes SA information to each of a set of vehicle UEs and determining available resources for data transmission from the set of vehicle UEs based on the set of SA information. In one embodiment, one or more of the BSs 101-103 transmits the set of SA information to the set of vehicle UEs in the wireless communication network. The set of SA information is transmitted on pre-determined frequency resources.

Although FIG. 1 illustrates one example of a wireless network 100, various changes may be made to FIG. 1. For example, the wireless network 100 could include any number of BSs (such as managing entities) and any number of UEs (such as vehicle terminals) in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

Figure 2:
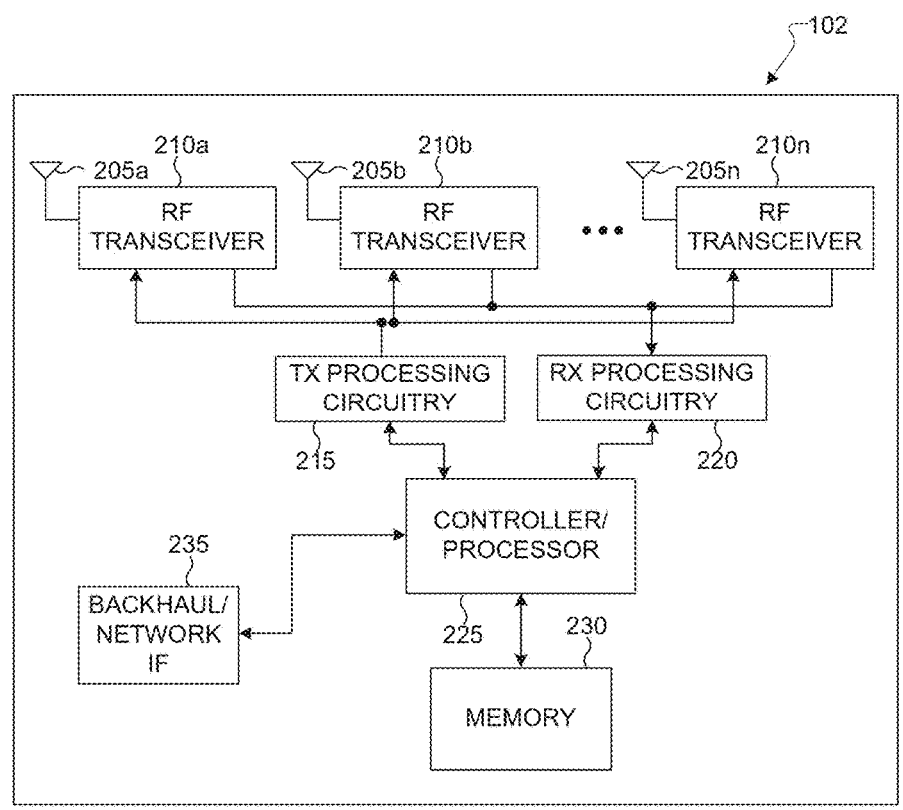
FIG. 2 illustrates an example base station (BS) according to embodiments of the present disclosure.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS. In one embodiment, the BSs may be implemented as eNodeB (eNB) or E-UTRAN or transmit reception point (TRP) or gNB in a 4G or 5G or future V2X communication network.

As shown in FIG. 2, the BS 102 includes multiple antennas 205a-205n, multiple RF transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the network 100. In one embodiment, the UEs may be implemented as vehicle terminals in a V2X communication network. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

In some embodiments, the RF transceivers 210a-210n are configured to transmit PDSCH data through the semi-open-loop PDSCH data transmission according to the at least one of the plurality of precoder cycling types, wherein the at least one processor is further configured to identify the plurality of beams based on the at least one of the plurality of precoder cycling types, and wherein the precoder comprising the beam and co-phase, and the plurality of precoder cycling types is cycled across a plurality of resource blocks (RBs) using the at least one of the beam cycling or the co-phase cycling with at least one of a cycling period or granularity from at least one of a plurality of cycling periods or granularities including at least one of a single resource element (RE), a single RB, multiple REs, or multiple RBs.

In some embodiments, the RF transceiver 210a-210n are configured to receive channel state information (CSI) including the plurality of beams for the semi-open-loop PDSCH data transmission.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles.

The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the BS 102 to communicate with other devices or systems over a backhaul connection or over a network. The interface 235 could support communications over any suitable wired or wireless connection(s). For example, when the BS 102 is implemented as part of a cellular communication system (such as one supporting V2P, V2I, V2V, D2D, 5G new radio access technology (NR), LTE, LTE-A, or LAA), the interface 235 could allow the BS 102 to communicate with other BSs over a wired or wireless backhaul connection. When the BS 102 is implemented as an access point, the interface 235 could allow the BS 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is configured to identify a plurality of beams for a semi-open-loop PDSCH data transmission based on at least one of a plurality of precoder cycling types, wherein a precoder comprises a beam and a co-phase, and the plurality of precoder cycling types including at least one of a beam cycling from the plurality of beams or a co-phase cycling from a plurality of co-phases.

In some embodiments, the controller/processor 225 is configured to identify a plurality of REs included in the plurality of RBs, identify each of the plurality of REs for at least one of a single RE or multiple REs level cycling period or granularity of the co-phase cycling on the plurality of precoder cycling types, and identify each of the plurality of RBs for at least one of the single RB or multiple RBs level cycling period or granularity of the beam cycling based on the plurality of precoder cycling types.

In such embodiments, each of the plurality of the co-phases being cycled across each of the identified plurality of REs and each of the plurality of the beams being cycled across each of plurality of the RBs.

In one example embodiment, the co-phase cycling comprises at least one set of co-phase values $$\left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\}$$

for a rank 1 transmission or one set of co-phase values $$\left\{ \begin{bmatrix} 1 & 1 \\ 1 & -1 \end{bmatrix}, \begin{bmatrix} 1 & 1 \\ j & -j \end{bmatrix} \right\}$$

for a rank 2 transmission that are cycled across the plurality of REs in at least one RB of the plurality of RBs.

In this example embodiment, the beam cycling comprises the plurality of beams that is cycled across at least one RB of the plurality of RBs, where in a given RB, beam cycling is in a single beam for rank 1 transmission or in a pair of beams for rank 2 transmission.

In another example embodiment, the co-phase cycling comprises at least two sets of co-phase values $$\left\{ \begin{bmatrix} 1 \\ 1 \end{bmatrix}, \begin{bmatrix} 1 \\ -1 \end{bmatrix} \right\} \text{ and } \left\{ \begin{bmatrix} 1 \\ j \end{bmatrix}, \begin{bmatrix} 1 \\ -j \end{bmatrix} \right\}$$

for a rank 1 transmission or two sets of co-phase values $$\left\{ \begin{bmatrix} 1 & 1 \\ 1 & -1 \end{bmatrix} \right\} \text{ and } \left\{ \begin{bmatrix} 1 & 1 \\ j & -j \end{bmatrix} \right\}$$

for a rank 2 transmission that are cycled across the plurality of REs in at least two consecutive RBs of the plurality of RBs.

In this later example embodiment, the beam cycling comprises the plurality of beams that is cycled across at least two consecutive RBs of the plurality of RBs, where in a given RB, beam cycling is in a single beam for rank 1 transmission or in a pair of beams for rank 2 transmission.

In some embodiments, the controller/processor 225 is configured to identify a number of demodulation reference signal (DMRS) sequences based on the plurality of precoder cycling types including the at least one of the beam cycling or the co-phase cycling, identify a physical resource block (PRB) bundling in accordance with the number of DMRS sequences for the DMRS channel estimation, and determine a number of the PRBs to be bundled based on the number of DMRS sequences.

In such embodiments, the PRB bundling for the DMRS channel estimation is configured by at least one of a radio resource control (RRC) signal received from the eNB or a pre-determined value.

The memory 230 is coupled to the controller/processor 225. Part of the memory 230 could include a RAM, and another part of the memory 230 could include a flash memory or other ROM.

Although FIG. 2 illustrates one example of BS 102, various changes may be made to FIG. 2. For example, the BS 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

Figure 3:
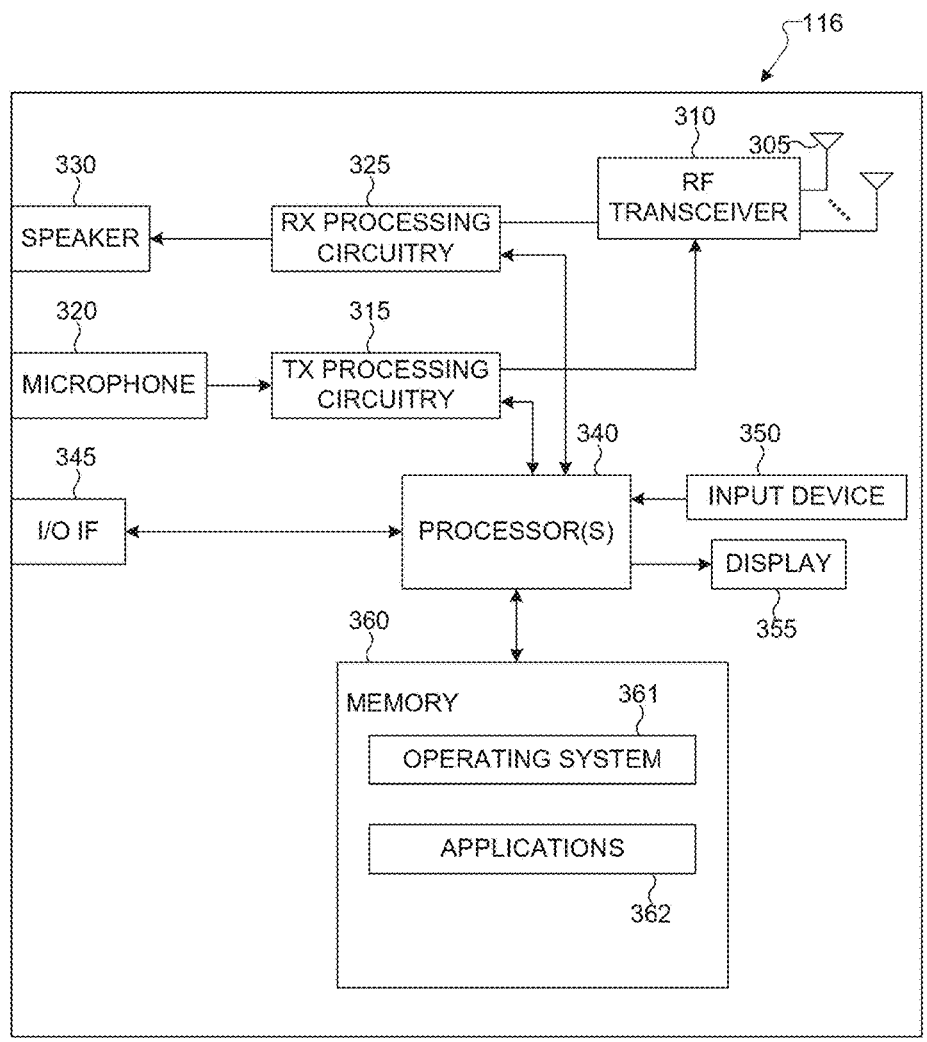
FIG. 3 illustrates an example user equipment (UE) according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE. In one embodiment, the UE 116 may be implemented as a vehicle terminal in a V2X communication network.

As shown in FIG. 3, the UE 116 includes a set of antennas 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the set of antennas 305, an incoming RF signal transmitted by an eNB of the network 100. The RF transceiver 310 down-converts the incoming RF signal to generate an intermediate frequency (IF) or baseband signal.

In some embodiments, the RF transceiver 310 is configured to receive PDSCH data through the semi-open-loop PDSCH data transmission according to the at least one of the plurality of precoder cycling types.

In some embodiments, the RF transceiver 310 is configured to transmit channel state information (CSI) including the plurality of beams for the semi-open-loop PDSCH data transmission.

The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

In some embodiments, the processor 340 is configured to identify a plurality of beams for a semi-open-loop PDSCH data transmission based on at least one of a plurality of precoder cycling types, wherein a precoder comprises a beam and a co-phase, and the plurality of precoder cycling types including at least one of a beam cycling from the plurality of beams or a co-phase cycling from a plurality of co-phases.

In some embodiments, the processor 340 is configured to identify the plurality of beams based on the at least one of the plurality of precoder cycling types.

In such embodiment, the precoder comprising the beam and co-phase, and the plurality of precoder cycling types is cycled across a plurality of resource blocks (RBs) using the at least one of the beam cycling or the co-phase cycling with at least one of a cycling period or granularity from at least one of a plurality of cycling periods or granularities including at least one of a single resource element (RE), a single RB, multiple REs, or multiple RBs.

In some embodiments, the processor 340 is configured to identify a plurality of REs included in the plurality of RBs, identify each of the plurality of REs for at least one of a single RE or multiple REs level cycling period or granularity of the co-phase cycling on the plurality of precoder cycling types, and identify each of the plurality of RBs for at least one of the single RB or multiple RBs level cycling period or granularity of the beam cycling based on the plurality of precoder cycling types.

In such embodiments, each of the plurality of the co-phases being cycled across each of the identified plurality of REs and each of the plurality of the beams being cycled across each of plurality of the RBs.

In one example embodiment, the co-phase cycling comprises at least one set of co-phase values $$\left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\}$$

for a rank 1 transmission or one set of co-phase values $$\left\{ \begin{bmatrix} 1 & 1 \\ 1 & -1 \end{bmatrix}, \begin{bmatrix} 1 & 1 \\ j & -j \end{bmatrix} \right\}$$

for a rank 2 transmission that are cycled across the plurality of REs in at least one RB of the plurality of RBs.

In this example embodiment, the beam cycling comprises the plurality of beams that is cycled across at least one RB of the plurality of RBs, where in a given RB, beam cycling is in a single beam for rank 1 transmission or in a pair of beams for rank 2 transmission.

In another example embodiment, the co-phase cycling comprises at least two sets of co-phase values $$\left\{ \begin{bmatrix} 1 \\ 1 \end{bmatrix}, \begin{bmatrix} 1 \\ -1 \end{bmatrix} \right\} \text{ and } \left\{ \begin{bmatrix} 1 \\ j \end{bmatrix}, \begin{bmatrix} 1 \\ -j \end{bmatrix} \right\}$$

for a rank 1 transmission or two sets of co-phase values $$\left\{ \begin{bmatrix} 1 & 1 \\ 1 & -1 \end{bmatrix} \right\} \text{ and } \left\{ \begin{bmatrix} 1 & 1 \\ j & -j \end{bmatrix} \right\}$$

for a rank 2 transmission that are cycled across the plurality of REs in at least two consecutive RBs of the plurality of RBs.

In this later example embodiment, the beam cycling comprises the plurality of beams that is cycled across at least two consecutive RBs of the plurality of RBs, where in a given RB, beam cycling is in a single beam for rank 1 transmission or in a pair of beams for rank 2 transmission.

In some embodiments, the processor 340 is configured to identify a number of demodulation reference signal (DMRS) sequences based on the plurality of precoder cycling types including the at least one of the beam cycling or the co-phase cycling, identify a physical resource block (PRB) bundling in accordance with the number of DMRS sequences for the DMRS channel estimation, and determine a number of the PRBs to be bundled based on the number of DMRS sequences.

In such embodiments, the PRB bundling for the DMRS channel estimation is configured by at least one of a radio resource control (RRC) signal received from the eNB or a pre-determined value.

The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the UE 116 may include only one antenna 305 or any number of antennas 305. Also, while FIG. 3 illustrates the UE 116 configured as a mobile telephone or smartphone, UEs could be configured to operate as other types of mobile or stationary devices.

Figure 4:
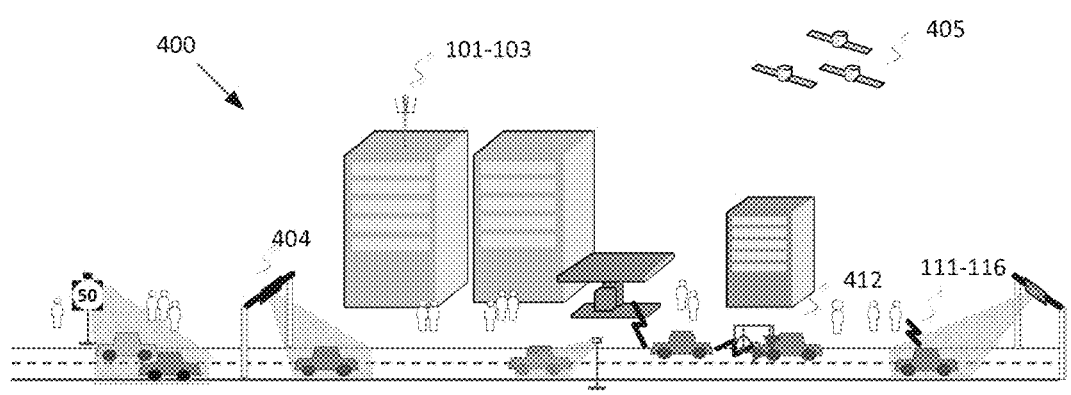
FIG. 4 illustrates an example vehicle communication network (V2X) according to embodiments of the present disclosure.

FIG. 4 illustrates an example vehicle (V2X, V2V) communication network 400 according to embodiments of the present disclosure. An embodiment of the V2X network 400 shown in FIG. 4 is for illustration only. Other embodiments may be used without departing from the scope of the present disclosure.

As illustrated in FIG. 4, V2X communication (e.g., V2V communication) may be used to implement many kinds of services that are complementary to the primary communication network or provide new services based on the flexibility of the network topology. V2X may support unicasting, broadcasting, or groupcasting is a potential means for V2V communication where vehicles are able to transmit messages to all in-range V2V-enabled devices or a subset of devices which are members of particular group. For example, a protocol may be based on LTE-D2D or a specialized LTE-V2V protocol. V2X can support V2I communication between one or more vehicles and an infrastructure node (101-103) to provide cellular connectivity as well as specialized services related to control and safety of vehicular traffic. V2P communication for UE's 111-116 can be supported as well, for example to provide safety services for pedestrians or traffic management services. V2X multicast communication can be used to provide safety and control messages to large numbers of vehicles in an efficient fashion.

While vehicle devices may be able to support many different communication protocols, and mandatory and optional features, since the traffic types, QoS requirements, and deployment topologies are distinct from other types of communication, the hardware/software on a vehicle for supporting V2X may have a reduced or specialized functionality compared to other devices. For example protocols related to low-complexity, low-data rate, and/or low-latency, machine-type communication protocols 404 may be supported (such as traffic tracking beacons).

Satellite-based communication 405 may also be supported for V2X networks for communication or positioning services. Additionally networks may require devices to operate in near simultaneous fashion when switching between V2X communications modes. Vehicle-to-vehicle communication 412 may also be supported for V2X networks for communication or positioning services.

V2X requires resource allocation mechanisms since multiple V2X UEs may have a need to utilize the same time/frequency resources as other V2X or cellular or D2D UEs. In addition to resource allocation signaling for the transmitting UEs, in the case of V2X, receiving UEs may also require resource allocation signaling in order to determine which time/frequency resources to monitor to receive the transmissions of one of more V2X UEs. Different resource allocation granularity may need to be supported depending on multiple factors including deployment scenarios (such as in/outside network coverage) and traffic types (such as unicast, groupcast, video, etc.).

Traditionally for centralized resource management, a central controller (such as managing entity) like the eNB collects all the channel state information of every UE in the cell and allocates the available resources to maximize a throughput according to fairness and power constraints. For UEs within network coverage, the eNB may be responsible for allocating resources for a group of UEs. Based on the eNB or autonomous resource selection, the transmitting UEs can provide a scheduling assignment signaling indicating the resources the Rx UEs monitor for reception of the data (e.g., this is called as "Mode 1" resource allocation).

On the other hand, especially considering an out-of-network coverage scenario, UEs can determine their resource allocation independently in a distributed fashion (e.g., this is called as "Mode 2" resource allocation). Simple random resource selection may be considered as a baseline distributed approach with a low overhead and scalability. One drawback of such an approach is that collisions are possible among broadcasting UEs. Thus an implicit coordination (such as energy sensing) and/or explicit coordination (such as sensing based on scheduling assignment transmission) would be required to prevent collisions and mitigate interference.

Figure 5:
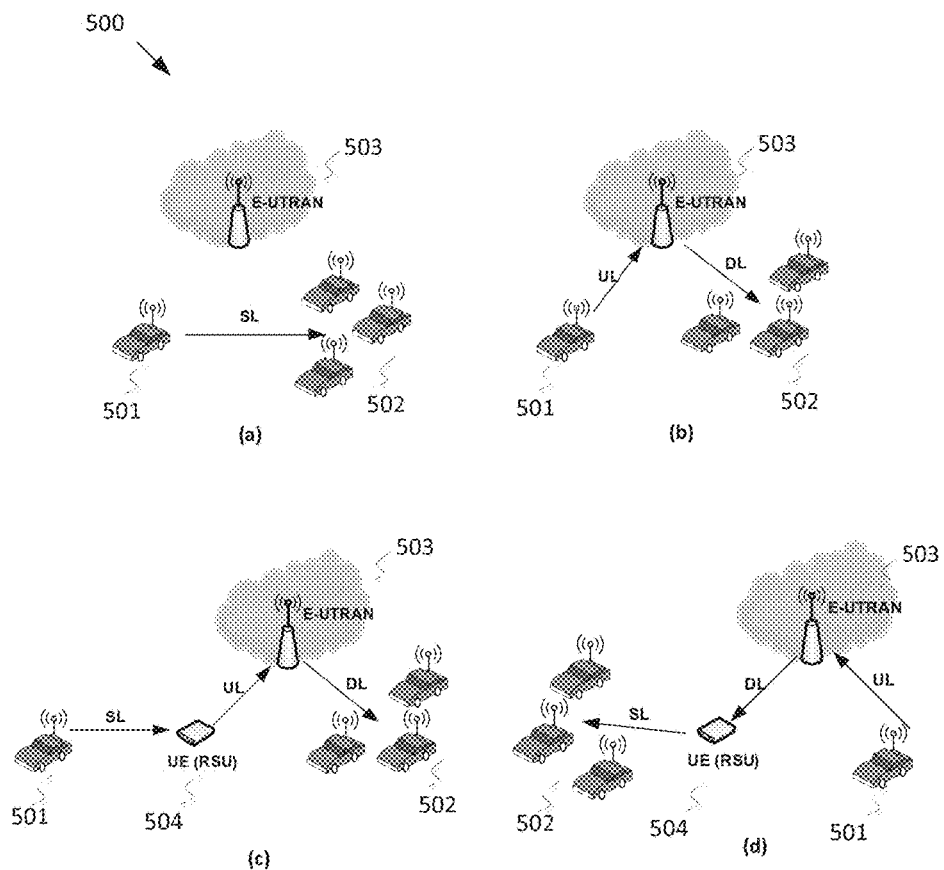
FIG. 5 illustrates examples V2X communication networks according to embodiments of the present disclosure.

FIG. 5 illustrates examples V2X communication networks 500 according to embodiments of the present disclosure. An embodiment of the V2X communication networks 500 shown in FIG. 5 is for illustration only. Other embodiments may be used without departing from the scope of the present disclosure. As shown in FIG. 5, the V2X communication networks 500 comprise a plurality of vehicle terminals (UE) 501, 502, a UE type (RSU) 504, and an E-UTRAN 503.

The sidelink (SL) interface is also known as the PC5 interface and the interface between the eNodeB and the UE is also known as the Uu interface. Multiple operation scenarios for V2X communication are shown in FIG. 5.

The scenario in FIG. 5(*a*) supports V2V operation only based on PC5. In this scenario, the UE 501 transmits a V2X message to multiple UEs 502 at a local area in sidelink. The scenario shown in FIG. 5(*b*) supports V2V operation only based on Uu. In this scenario, the UE 501 transmits a V2X message to the E-UTRAN 503 in uplink and the E-UTRAN 503 transmits the V2X message to the multiple the UEs 502 at a local area in downlink. To support this scenario, the E-UTRAN 503 performs uplink reception and downlink transmission of V2X messages. For downlink, the E-UTRAN 503 may use a broadcast mechanism. In the scenario shown in FIG. 5(*c*), the UE 501 transmits a V2X message to other UEs 502 in sidelink. One of the receiving UEs is a UE type RSU (Road Side Unit) 504 which receives the V2X message in sidelink and transmits the V2X message to the E-UTRAN 503 in uplink.

The E-UTRAN 503 receives the V2X message from the UE type RSU 504 and then transmits the V2X message to multiple UEs 502 at a local area in downlink. To support this scenario, the E-UTRAN 503 performs uplink reception and downlink transmission of the V2X messages. For downlink, the E-UTRAN 503 may use a broadcast mechanism. In the scenario shown in FIG. 5(d), the UE 501 transmits a V2X message to the E-UTRAN 503 in uplink and the E-UTRAN 503 transmits the V2X message to one or more UE type RSUs 504. Then, the UE type RSU 504 transmits the V2X message to other UEs 502 in sidelink. To support this scenario, the E-UTRAN 503 performs uplink reception and downlink transmission of V2X messages. For downlink, the E-UTRAN 503 may use a broadcast mechanism.

As can be seen from the use cases considered in FIG. 5, the information is sent to multiple vehicles terminals (UEs) 502 in a given area via the sidelink (SL) PC5 or downlink (DL) Uu interface. Hence, support for broadcasting/multicasting is important in the design to reduce overhead and latency for communication.

Figure 6:
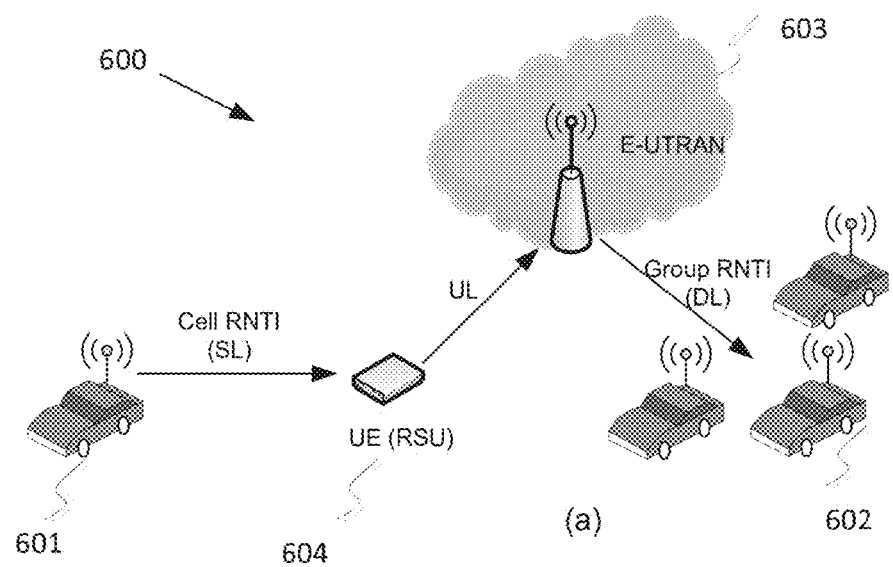
FIG. 6 illustrates an example group radio network temporary identification (RNTI) in a V2X communication network according to embodiments of the present disclosure.

FIG. 6 illustrates an example group radio network temporary identification (RNTI) in a V2X communication network 600 according to embodiments of the present disclosure. An embodiment of the group RNTI in a V2X communication network 600 shown in FIG. 6 is for illustration only. Other embodiments may be used without departing from the scope of the present disclosure. As shown in FIG. 6, the group radio network RNTI in the V2X communication network 600 comprises a UE 601, a group of UEs 602, an E-UTRAN 603, and a UE (RSU) 604. In this case, a cell RNTI may be transmitted over a sidelink (SL) from the UE 601 to the E-UTRAN 603 through the UE (RSU) 604.

One embodiment for multicasting to vehicles for V2X communication is to use a group RNTI. The UE could support multiple RNTIs, depending on the type of communication. For example, a V2V communication can use a UE-specific cell RNTI (C-RNTI) while a V2I DL communication can use a group RNTI that can be shared among multiple vehicles in a given area. The eNodeB 203 configures the group RNTI for the UE using RRC. Similarly, a group RNTI can also be used for communication on the sidelink channel. In this case, the group RNTI can be passed from the eNodeB 603 (E-UTRAN) to the UE RSU 604 on the Uu interface.

Figure 7:
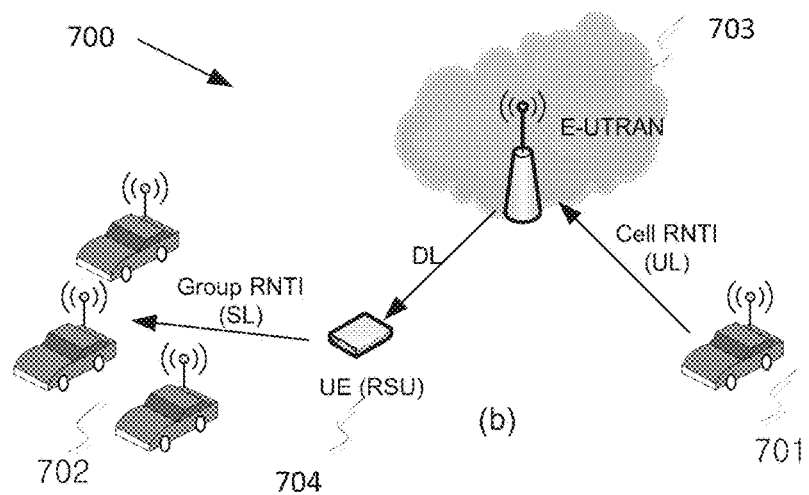
FIG. 7 illustrates another example group RNTI in a V2X communication network according to embodiments of the present disclosure.

FIG. 7 illustrates another example group RNTI in a V2X communication network 700 according to embodiments of the present disclosure. An embodiment of the group RNTI in a V2X communication network 700 shown in FIG. 7 is for illustration only. Other embodiments may be used without departing from the scope of the present disclosure. As shown in FIG. 7, the group radio network RNTI in the V2X communication network 700 comprises a UE 701, a group of UEs 702, an E-UTRAN 703, and a UE (RSU) 704. In this case, a cell RNTI may be transmitted over an uplink (UL) from the UE 701 to the E-UTRAN 703.

Figure 8:
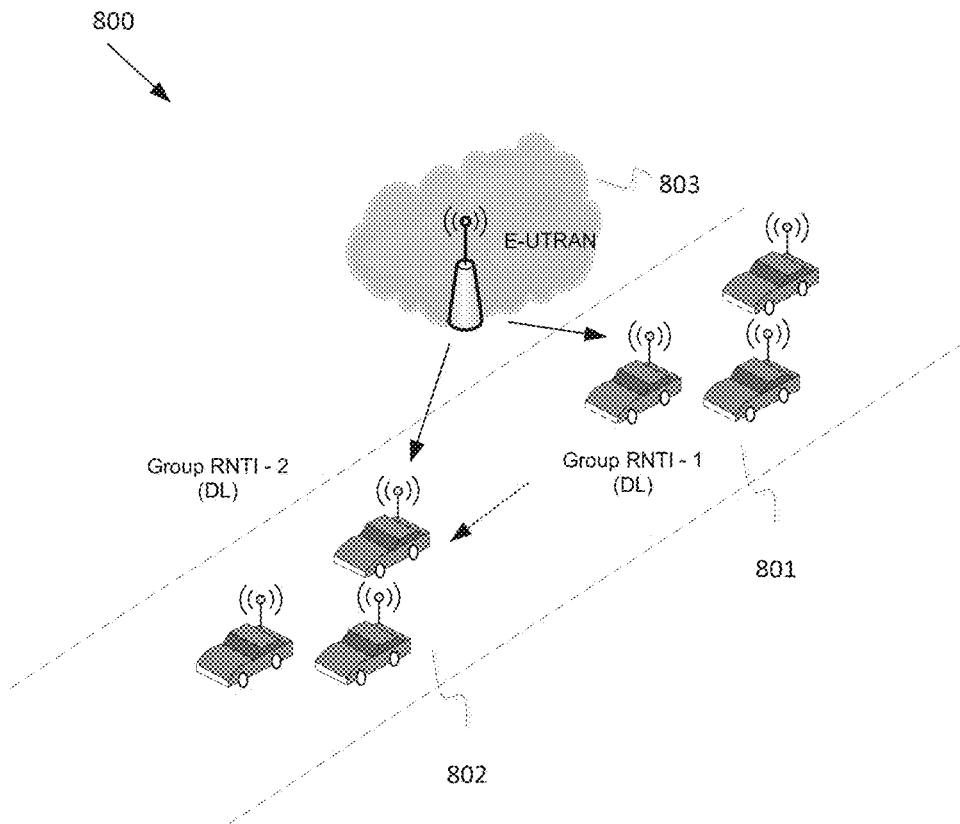
FIG. 8 illustrates another example group RNTI in a V2X communication network according to embodiments of the present disclosure.

FIG. 8 illustrates another example group RNTI in a V2X communication network 800 according to embodiments of the present disclosure. An embodiment of the group RNTI in a V2X communication network 800 shown in FIG. 8 is for illustration only. Other embodiments may be used without departing from the scope of the present disclosure. As shown in FIG. 8, group RNTI in the V2X communication network 800 comprises a plurality of UEs 801, a plurality of UEs 802, and an E-UTRAN 803.

An eNodeB 803 (E-UTRAN) may support multiple group RNTIs within a cell depending on location, traffic direction, congestion etc. In such cases, the eNodeB re-configures the group RNTI for the UEs during mobility from one group to another within the cell using RRC for multicasting while keeping the same C-RNTI within the cell for unicast traffic. As shown in FIG. 8, vehicles that are part of the plurality of UEs 801 of the eNodeB 803 may move to become part of the plurality of UEs 802 (e.g., a new group).

Figure 9:
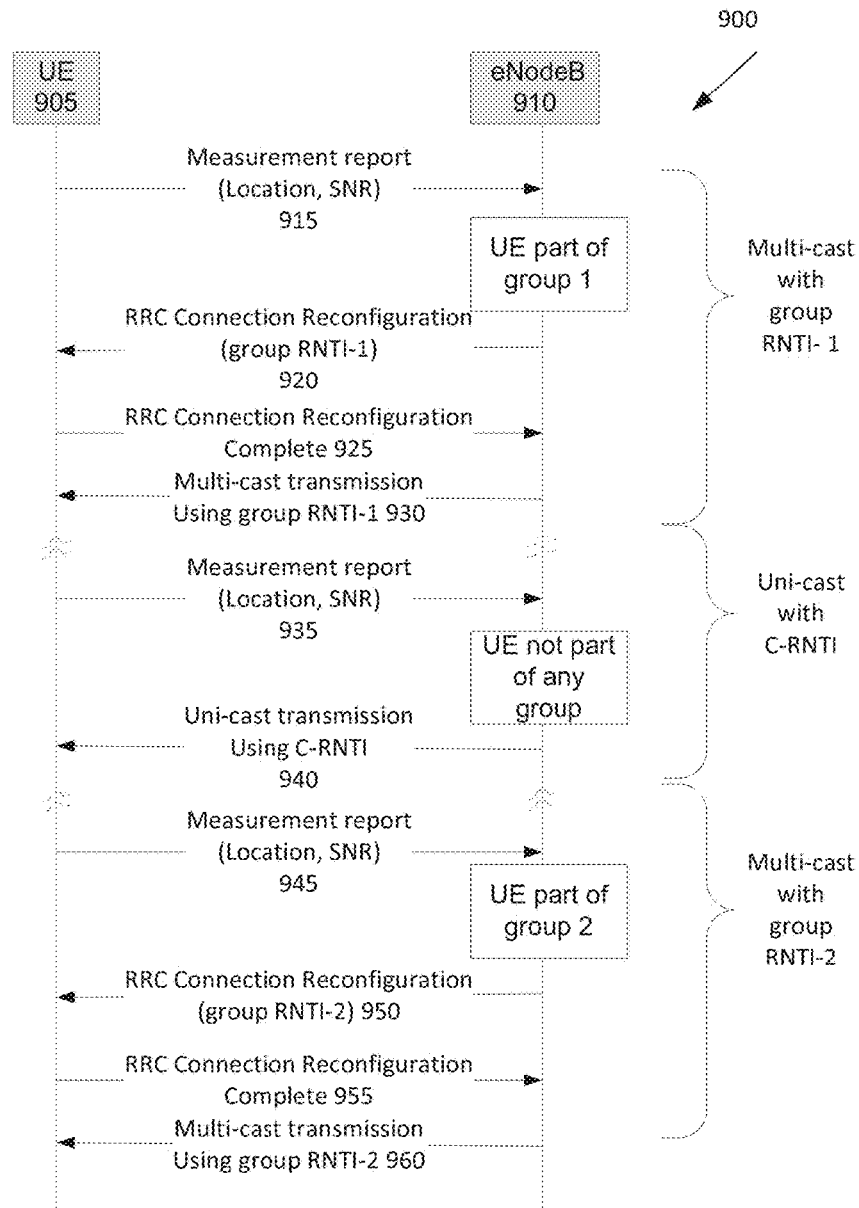
FIG. 9 illustrates an example call flow for group RNTI allocation according to embodiments of the present disclosure.

FIG. 9 illustrates an example call flow for group RNTI allocation 900 according to embodiments of the present disclosure. An embodiment of the call flow for group RNTI allocation 900 shown in FIG. 4 is for illustration only. Other embodiments may be used without departing from the scope of the present disclosure. As shown in FIG. 9, the call flow for group RNTI allocation 900 comprises a UE 905 and an eNB 910. The UE 905 transmits a measurement report at step 915. The eNB 910 transmits an RRC connection reconfiguration message to the UE 905 at step 920. After then, the UE 905 transmits an RRC connection reconfiguration complete message to the eNB 910 at step 925. The eNB 910 starts multi-cast transmission using a group RNTI at step 930. The UE 905 transmits the measurement report message to the eNB at step 935. The eNB 910 starts transmit unicast transmission at step 940. The UE transmits the measurement report message including location and SNR information to the eNB 910 at step 945. The eNB 910 transmits the RRC connection reconfiguration message to the UE 905 at step 950. The UE 905 transmits the RRC connection reconfiguration message to the eNB 910 at step 955. Finally, the eNB 910 starts multi-cast transmission using a group RNTI to the UE 905 at step 960.

As shown in FIG. 9, the eNodeB provides the group RNTI to the UE by a RRC connection reconfiguration. The eNodeB scrambles the (enhanced) physical downlink control channel ((E)PDCCH) and the packet data shared channel (PDSCH) by the group RNTI during multicast transmission. When the UE moves out of a group, the UE can still receive unicast traffic based on C-RNTI until the eNodeB assigns a new group RNTI for the UE.

The eNodeB makes a decision whether the UE is part of a given group, based on the information received from the measurement report of the UE. This measurement report can include information (e.g., location, signal to noise ratio (SNR) etc.) which can inform the eNodeB which group the UE may be assigned to. In the example shown in FIG. 9, the eNodeB first assigns the UE to group 1 and sends a RRC connection reconfiguration message. This reconfiguration message includes the group RNTI-1 information that may be used for multicasting to all vehicles within the group. Once the UE moves out of the group, based on the location information, the eNodeB can still provide information to the UE based on unicast transmissions, until the UE joins a new group and then gets a new group RNTI-2, which can be used for subsequent multicasting by the eNodeB.

Figure 10:
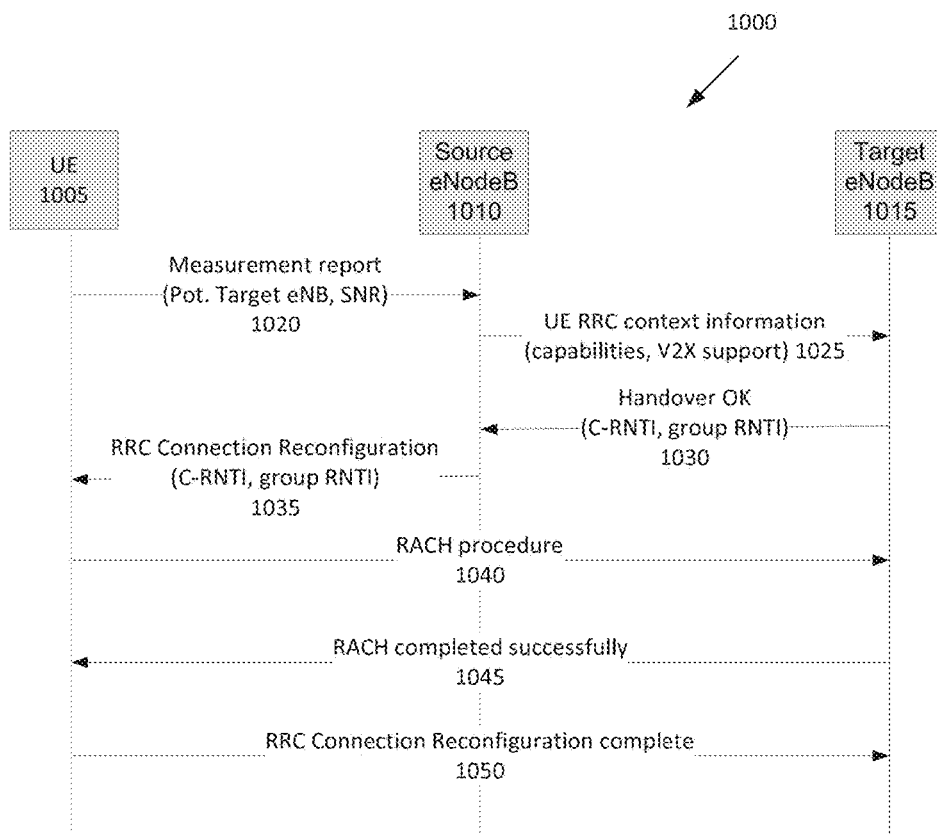
FIG. 10 illustrates an example handover operation between different groups according to embodiments of the present disclosure.

FIG. 10 illustrates an example handover operation between different groups 1000 according to embodiments of the present disclosure. An embodiment of the handover operation between different groups 1000 shown in FIG. 10 is for illustration only. Other embodiments may be used without departing from the scope of the present disclosure. As shown in FIG. 10, the handover operation between different groups 1000 comprises a UE 1005, a source eNB 1010, and a target eNB 1015. As shown in FIG. 10, the UE 1005 transmits a measurement report to the source eNB 1010 at step 1020. The source eNB 1010 transmits UE RRC context information to the target eNB 1015 at step 1025. The target eNB 1015 transmits a handover OK to the source eNB 1010 at step 1030. The source eNB 1010 transmits an RRC connection reconfiguration to the UE 1005 at step 1035. After then the UE 1005 starts a random access channel (RACH) procedure with the target eNB 1015 at step 1040. The target eNB transmit an RACH completed successfully to the UE at step 1045. Finally, the UE 1005 transmits an RRC connection reconfiguration complete to the target eNB 1015 at step 1050.

As shown in FIG. 10, once the source eNodeB makes a determination that the UE is going to move out of the source eNodeB's range based on the measurement report, the source eNB may initiate a handover process to one or more target eNodeB's. During the handover process, the UE RRC context information such as the V2X capabilities of the UE can be exchanged. Once the target eNodeB accepts the handover, the target eNodeB may provide a new C-RNTI and a new group RNTI can be provided by the target eNodeB, which is then passed on the UE via a RRC connection reconfiguration. The UE then joins the target eNodeB after completing the RACH procedure and provides a RRC connection reconfiguration complete message to the target eNodeB.

Figure 11:
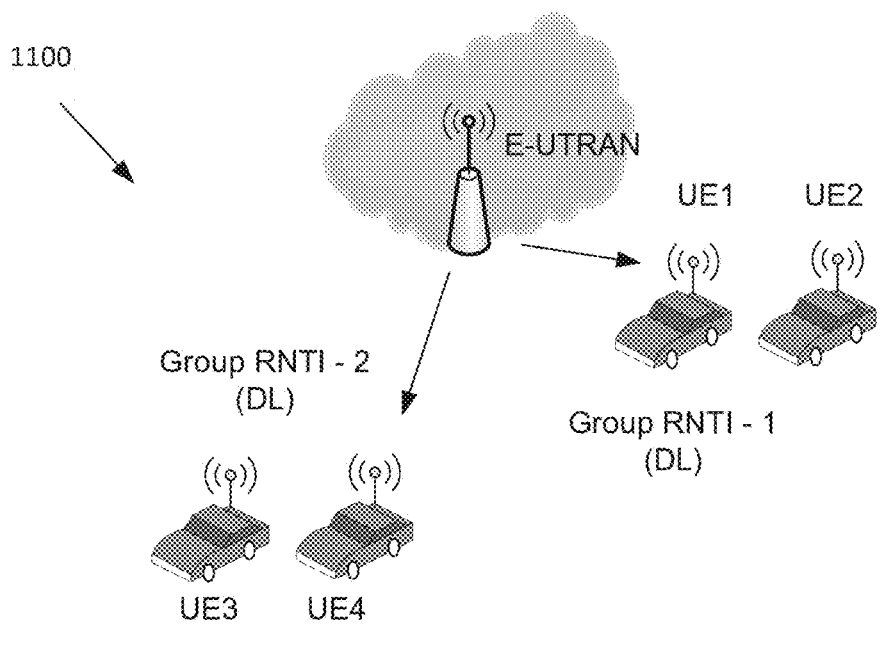
FIG. 11 illustrates an example multicasting for two groups using different group RNTI according to embodiments of the present disclosure.
Figure 11:
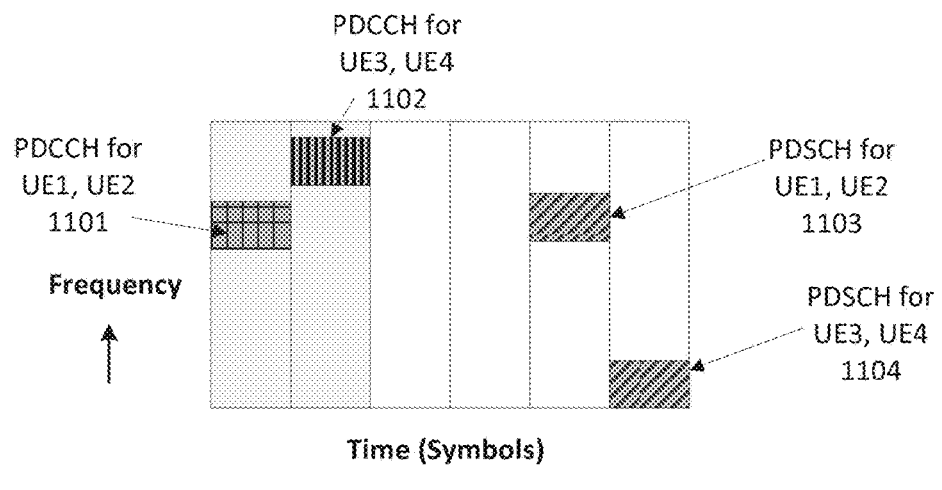

FIG. 11 illustrates an example multicasting for two groups using different group RNTI 1100 according to embodiments of the present disclosure. An embodiment of the multicasting for two groups using different group RNTI 1100 shown in FIG. 11 is for illustration only. Other embodiments may be used without departing from the scope of the present disclosure. As shown in FIG. 11, the multicasting for two groups using different group RNTI 1100 comprises a PDCCH for UE1 and UE2 1101, a PDCCH for UE3 and UE4 1102, a PDSCH for UE1 and UE2 1103, and a PDSCH for UE3 and UE4 1104.

FIG. 11 shows an example of two groups where the (E)PDCCH and PDSCH are both multicast using different group RNTI. In the example, UE1 and UE2 belong to group 1 and share the same (E)PDCCH 1101 and PDSCH 1103 while UE3 and UE4 belong to group 2 and share another (E)PDCCH 1102 and PDSCH 1104.

The (E)PDCCH may require some changes in the DCI message format for multicasting support. Currently, DCI Format 1A can be used either for unicast PDSCH or for paging a group of UEs configured with the same P-RNTI (which can be viewed as multicast PDSCH). The UE may decode DCI format 1A and check the CRC by descrambling (XOR) with the C-RNTI and the P-RNTI (in subframes where paging can be transmitted, e.g. SF 0/4/5/9 in FDD). The UE also checks the transmit power control-RNTI (TPC-RNTI) in addition to the P-RNTI only in the common search space (CSS). UE-common DCIs are only transmitted on control channel elements (CCE) for the CSS.

If the eNodeB configures the UE with a group RNTI for multicasting, the UE may decode DCI format 1A and check the CRC by XOR with the group RNTI in addition to the other RNTI such as C-RNTI, P-RNTI etc. For example, if the CRC check on the DCI format 1A passes by XOR with the group RNTI, the UE determines that this is a multicast transmission from the eNodeB. This information may be useful to the UE to interpret the message encoded in the DCI format as some of the fields can have a different interpretation for multicast support.

It is assumed that the eNodeB may not simultaneously schedule the UE for both unicast and multicast (currently, the UE is assumed to receive only one PDSCH per cell). If, due to false CRC check, the UE detects both unicast and multicast scheduling, the UE may prioritize one and treat the other as invalid. In terms of preference, the UE can prioritize multicast as the DCI may probably have reserved bits (from unicast fields that are not needed for multicast scheduling) that are used as virtual CRC (hence, a stronger CRC than for unicast scheduling).

Figure 12:
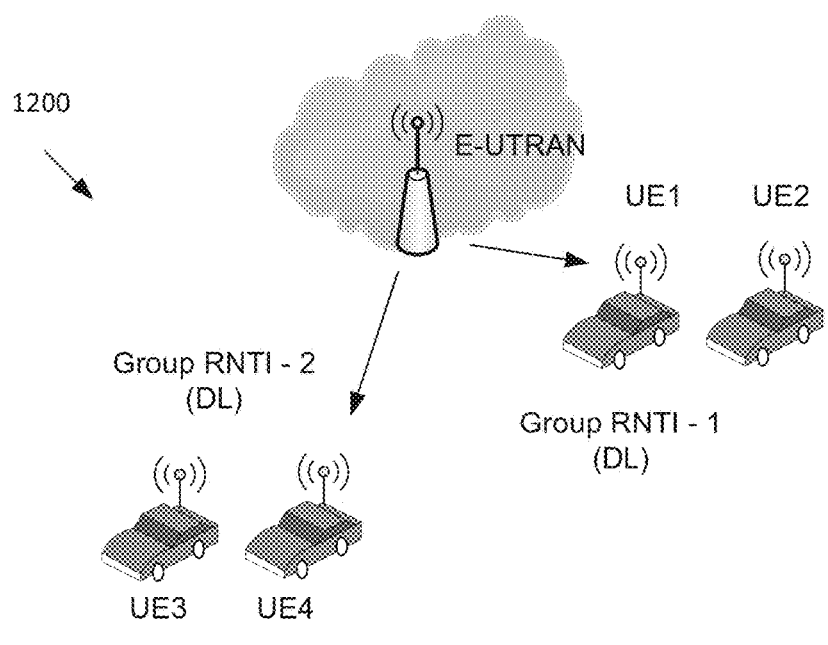
FIG. 12 illustrates another example multicasting for two groups using different group RNTI according to embodiments of the present disclosure.
Figure 12:
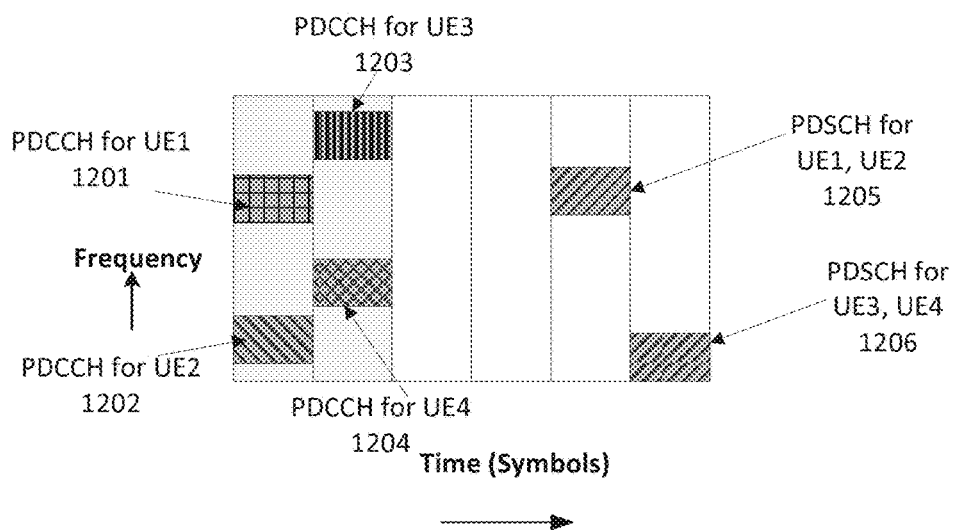

FIG. 12 illustrates another example multicasting for two groups using different group RNTI 1200 according to embodiments of the present disclosure. An embodiment of the multicasting for two groups using different group RNTI 1200 shown in FIG. 12 is for illustration only. Other embodiments may be used without departing from the scope of the present disclosure. As shown in FIG. 12, the multicasting for two groups using different group RNTI 1200 comprises a PDCCH for UE1 1201, a PDCCH for UE2 1202, a PDCCH for UE 3 1203, a PDCCH for UE 4 1204, a PDSCH for UE1 and UE2 1205, and a PDSCH for UE3 and UE4 1206.

An alternate embodiment for multicasting is multicasting PDSCH only. In such embodiment, the eNodeB sends the (E)PDCCH information for each UE as a unicast transmission. The (E)PDCCH for multiple UEs in a group point to the same PDSCH data location. The eNodeB scrambles the unicast (E)PDCCH with the C-RNTI and the multicast PDSCH with a fixed (reserved) RNTI so that it can be decoded by multiple UEs. The (E)PDCCH resource allocation field provides the locations for a UE to monitor for the associated shared PDSCH. As shown in FIG. 12, UE1 1201 and UE2 1202 are members of group 1 while UE3 and UE4 are members of group 2. The (E)PDCCH for both UE1 1201 and UE2 1202 contains the locations for group 1 PDSCH 1205 in resource allocation while the (E)PDCCH for both UE3 1203 and UE4 1204 contain the locations for group 2 PDSCH 1206 in resource allocation.

In such embodiment, the need to support a RNTI per grouping and the eNodeB can transparently re-assign grouping of UEs during mobility (as shown in FIG. 6 and FIG. 7) using the unicast (E)PDCCH. The (E)PDCCH may require some changes in the downlink channel information (DCI) message format for multicasting for multiple resource allocations. If the CRC check of the DCI message format passes using the fixed RNTI, the DCI message can be interpreted differently for multicasting. For example, the RB assignment fields may allow overlap in RBs so that RBs can be shared for multicasting.

Figure 13:
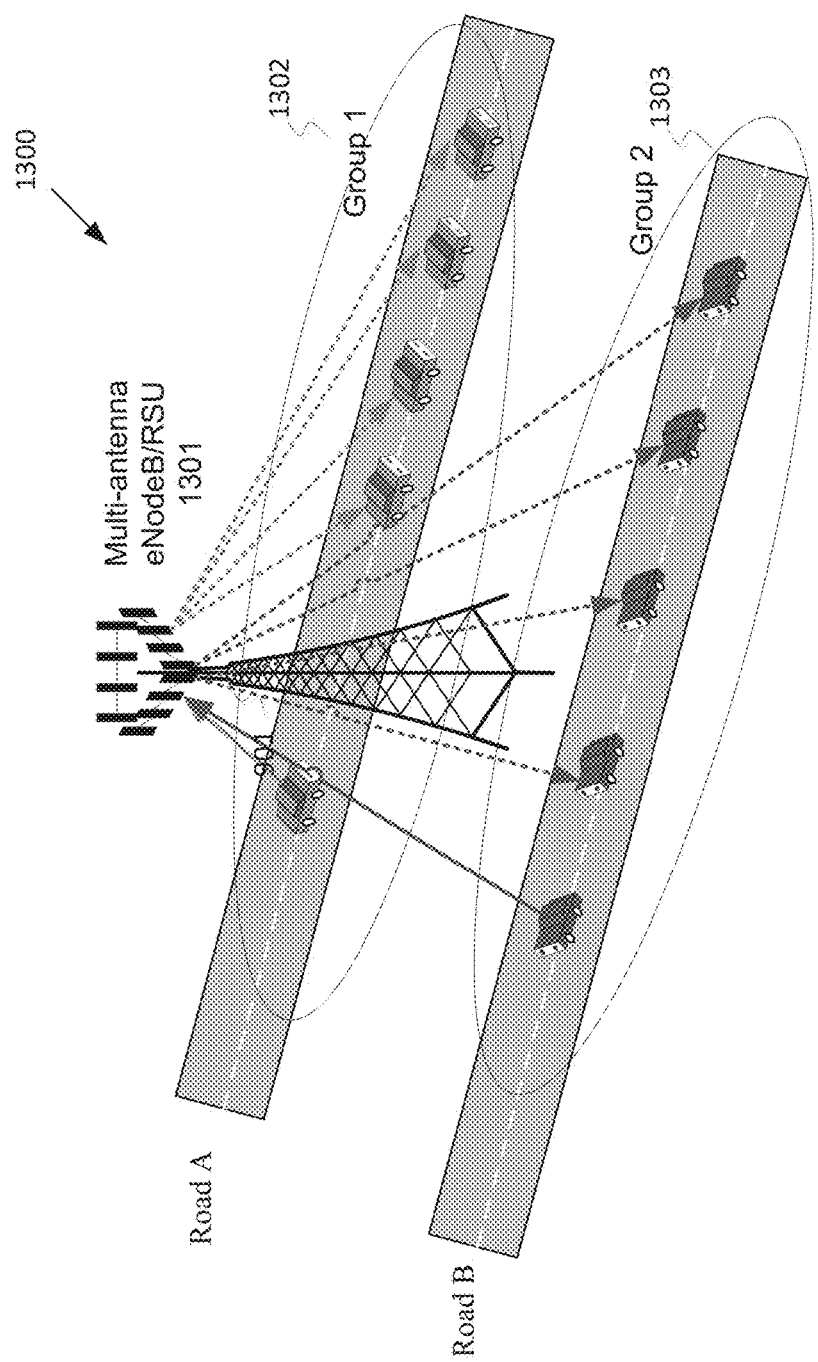
FIG. 13 illustrates an example spatial multiplexing for multiple groups according to embodiments of the present disclosure.

FIG. 13 illustrates an example spatial multiplexing for multiple groups 1300 according to embodiments of the present disclosure. An embodiment of the spatial multiplexing for multiple groups 1300 shown in FIG. 13 is for illustration only. Other embodiments may be used without departing from the scope of the present disclosure. As shown in FIG. 13, the spatial multiplexing for multiple groups 1300 comprises a group 1 1302 and a group 2 1303.

Furthermore, multicasting for multiple groups can benefit from multiple antennas at RSU or eNodeB. The RSU or eNodeB can spatially multiplex multiple groups for latency reduction and for capacity improvement. As shown in FIG. 13, the RSU or eNodeB 1301 can spatially multiplex vehicles in different directions, for example, into multiple groups such as the group 1 1302 and the group 2 1303 for simultaneous operation. The eNodeB/RSU 1301 can use location and vehicle direction information, for example, for resource allocation and grouping of vehicles for multicasting. The eNodeB/RSU 1301 can also spatially separate groups in the same direction using beamforming, depending on the distance. Thus, the eNodeB/RSU 1301 can support multicasting in conjunction with multiuser (MU)-MIMO techniques for improved latency and capacity enhancements.

Figure 14:
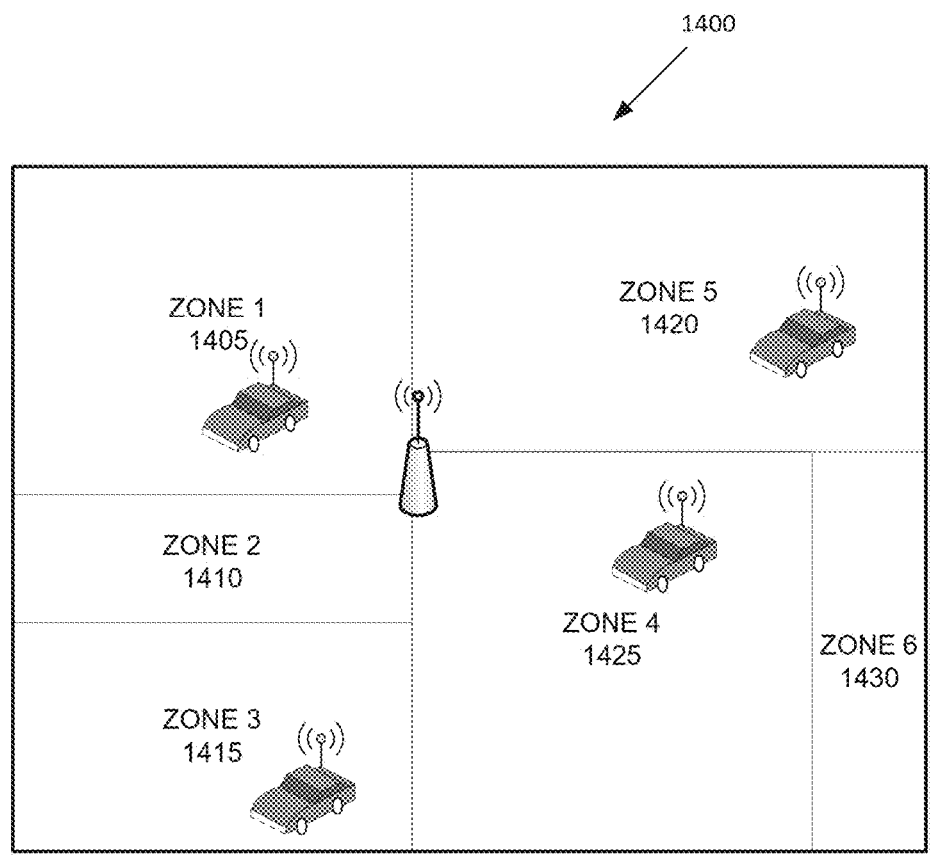
FIG. 14 illustrates an example transmission of V2X message according to embodiments of the present disclosure.

FIG. 14 illustrates an example transmission of V2X message 1400 according to embodiments of the present disclosure. An embodiment of the transmission of V2X message 1400 shown in FIG. 14 is for illustration only. Other embodiments may be used without departing from the scope of the present disclosure. As shown in FIG. 14, the transmission of V2X message 1400 comprises a zone 1 1405, a zone 2 1410, a zone 3 1415, a zone 4 1425, a zone 5 1420, and a zone 6 1430.

In one embodiment, a transmission of V2X messages is distributed based on zones within a cell as shown in FIG. 14. The zones are defined based on a mapping between geolocation information and resources. Each zone supports a different resource pool and different group-RNTIs. A V2X message is multi-cast only to vehicle UEs in a given zone. As the vehicle UE moves across zones, it is configured with a different group RNTI.

Figure 15:
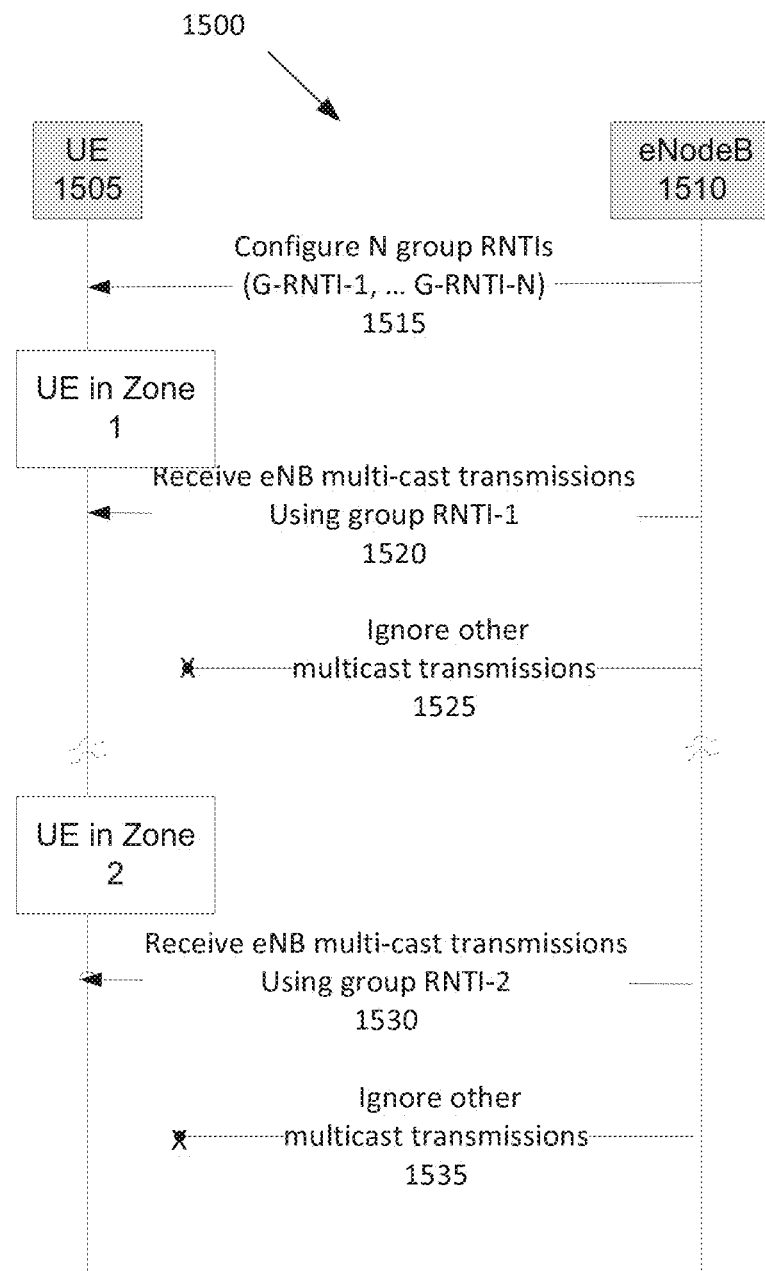
FIG. 15 illustrates an example call flow for allocating multiple groups by an eNodeB (eNB) according to embodiments of the present disclosure.

FIG. 15 illustrates an example call flow for allocating multiple groups by an eNodeB (eNB) 1510 according to embodiments of the present disclosure. An embodiment of the call flow for allocating multiple groups by the eNB 1510 shown in FIG. 15 is for illustration only. Other embodiments may be used without departing from the scope of the present disclosure. As shown in FIG. 15, the call flow 1500 comprises a UE 1505 and an eNodeB 1510. The eNodeB 1510 transmits a message to configure N group RNTIs at step 1515. The eNodeB 1510 starts eNB multi-cast transmissions using group RNTI-1 at step 1520. At step 1525, the eNodeB 1510 may ignore other multi-cast transmissions. The eNodeB starts eNB multi-cast transmissions using group RNTI-2 at step 1530. The eNodeB may ignore other multi-cast transmissions at step 1535.

In order to minimize frequent RRC connections and updating group RNTIs as UEs move across zones, it may be desirable to configure the UE with multiple group RNTIs. In this case, as the UE moves across zones, it can automatically update its group RNTI based on its location (provided using upper layers e.g. GPS) to receive messages identified for that zone, without any intervention from the base-station to reconfigure the group RNTIs for that zone. As shown in FIG. 15, the eNB configures multiple (N) group RNTIs (G-RNTI-1 . . . G-RNTI-N) for a vehicle UE to receive multicast messages that are zone dependent. Each multicast message is scrambled with the G-RNTI relevant to that zone. The UE based on the UE's zone location (identified by upper layers e.g. GPS) receives the multicast message relevant for the UE's zone. As the UE changes zones, the UE receives a different multi-cast message.

In order to support (E)PDCCH transmission using multicasting with MU-MIMO, a new DCI format can be created. Also, one of the existing DCI formats can be re-used for this purpose by changing the interpretation of certain fields when the eNodeB has configured the UE with a group RNTI and the CRC check on the DCI format passes when descrambled with the configured group RNTI. For example, a format with the size of DCI 1A can be used to support multicast for a group of UEs by changing the meaning of some fields when the RNTI is a group RNTI. For example, the HARQ process field in for 1A can be used as PMI when scrambled with the group RNTI by the eNodeB.

MIMO techniques such as full-dimension MIMO (FD-MIMO) can be considered for V2X communication. When a large number of TXRUs is available for PDSCH-based multicasting, FD-MIMO features can be utilized to increase the quality of DL transmission via beamforming gain. However, a conventional FD-MIMO was designed primarily for low mobility UEs (e.g. 3 km/h) which focuses on enabling dynamic beamforming based on closed-loop operation using CSI feedback; and thus may not be suitable for V2X scenarios with high-mobility requirements (with the maximum of 500 km/h relative speed). In one example, an open-loop MIMO pre-coding (or beam-forming) based scheme is proposed for high mobility UEs assuming no CSI feedback. Since UE mobility range is large in V2X (from 0 km/h to 500 km/h) communications, a more flexible MIMO multicasting scheme may be needed.

One such scheme can be based on an open-loop transmission with partial CSI feedback in which eNB performs MIMO pre-coding for V2X UEs based on partial CSI feedback from UEs. In one embodiment, a class of DMRS-based transmission schemes which utilizes some open-loop transmission schemes and partial CSI reporting is considered for eFD-MIMO to enable semi-dynamic beamforming.

An open-loop transmission scheme such as beamformer (or pre-coder) cycling is introduced in conjunction with long-term and wideband PMI reporting, where the PMI corresponds to a beam group in 1D or 2D depending on the antenna port layout at eNB. For instance, the PMI may correspond to the $W_1$ component feedback from a dual-stage $W_1W_2$ codebook in LTE FD-MIMO which represents a beam group. As the UE is configured to report PMI associated with $W_1$ only, the eNB transmits the multicast data via a group of beams rather than one beam as typically done in dynamic beamforming. As evident, this scheme is particularly suited for group-based multicasting since the eNB can group UEs based on their $W_1$ feedback.

LTE Release 13 FD-MIMO supports four beam grouping based on Codebook-Config parameter as shown in FIG. 24 for $N_1 \geq N_2$, where $N_1$ and $N_2$ respectively are the number of antenna ports (co-pol) in 1st and 2nd dimensions are the eNB; and $L_1$ and $L_2$ respectively are the number of beams in the 1st and 2nd dimensions of a beam group. The beams shown as black squares form a beam group inside a $(L_1, L_2)$ beam grid.

To enable semi-dynamic beamforming for V2X, some possible V2X-specific enhancements of semi-open-loop scheme may be considered.

In some embodiments, V2X UEs in a group are configured with the $W_1$ component of the LTE Rel. 13 FD-MIMO or Rel. 14 enhanced FD-MIMO (eFD-MIMO) Class A codebook for semi-dynamic beam-forming via higher-layer RRC signaling. In such embodiments, the signaling includes parameters such as $N_1$, $N_2$ (number of antenna ports in 1st and 2nd dimensions respectively), $O_1$, $O_2$ (oversampling factors for discrete Fourier transform (DFT) beams (that form $W_1$ codebook) in 1st and 2nd dimensions respectively), and Codebook-Config ($W_1$ beam group).

In some embodiments, all supported parameter values that are supported in LTE Rel. 13 FD-MIMO or Rel. 14 eFD-MIMO are also supported in V2X. In some embodiments, some of the parameters are not supported. In one example, Codebook-Config=1 is not supported. In another example, 1D antenna port layouts are not supported. In yet another example, 1D beam groups such Codebook-Config=1, 4 in FIG. 24 are not supported.

In some embodiments, supported parameter values can be based on V2X UE specific parameter such as UE speed. For instance, a subset of codebook parameters can be for a specific range of UE speeds or UE mobility direction.

In some embodiments, V2X UEs in a group are configured with V2X specific $W_1$ codebook for semi-dynamic beam-forming via higher-layer RRC signaling. In one example, in addition to the five parameters aforementioned above, the $W_1$ codebook for V2X UEs is also parameterized by another codebook parameter L for the number of beams in a beam group, where the set of supported number of beams include {1, 2, 4, 8}. An illustration of Codebook-Config to beam group mapping for L=1, 2, 3, 4 is shown in FIG. 25.

Since each V2X UE group corresponds to a range of UE speeds within 0-500 km/h, the number of beams (L) in a beam group of the $W_1$ codebook can be a function UE group speed. For instance, the UE speed range 0-500 km/h can be divided into multiple UE speed sub-ranges and we can have multiple possible values for L. Note that the speed range for UEs in a given geographical area would be highly correlated. Each of these UE speed sub-ranges can then be mapped to a single L value. If the UE group speed falls in a specific UE speed range, then the corresponding L value is considered in $W_1$ reporting. From low to high UE group speed, the number of beams can be vary according to L=1, 2, 4, 8. For example, L=1 if UE group speed ≤3; L=2 if 3<UE group speed <30; L=4 if 30<UE group speed <100; and/or L=8 if 100<UE group speed. The number of beams (L value) is reported to the eNB for pre-coder cycling using a 2-bit indication in the CSI report. Alternatively, eNB configures an L value to the UE group using higher-layer signaling.

In some embodiments, the L value is either configured by the eNB or reported by the UE implicitly using the Codebook-Config parameter. For instance, Codebook-Config=0 may correspond to L=1; Codebook-Config=1a, 1b, and 1c may correspond to three beam groups for L=2 in FIG. 25; Codebook-Config=2, 3, and 4 may correspond to three beam groups for L=4 in FIG. 25; and Codebook-Config=5, 6, and 7 may correspond to three beam groups for L=8 in FIG. 25.

In some embodiments, a subset of V2X UEs in a group is configured to report CSI feedback comprising of the WB and long-term PMI using $W_1$ codebook. This is due to fact that UEs belonging to a UE group are likely to have highly correlated channels; hence the CSI feedback from all UEs in a UE group may not be necessary. Therefore, eNB can configure CSI reporting from a subset of all UEs in a UE group. Depending on the configured number of UEs in a UE group. In one embodiment, W1 is reported from exactly one UE in a UE group. In such embodiment, eNB can simply adopt a round-robin based configuration. In another embodiment, W1 is reported from all UEs in a UE group. In yet another embodiment, W1 is reported from fewer than all UEs in a UE group. In such embodiment, an eNB can schedule 2 UEs in the UE group that are maximally separated in the UE group, where the separation between UEs may correspond to the distance between two UEs on a highway.

Since a UE in a UE group may either be in RRC_CONNECTED or RRC_IDLE mode at any given time, the configured subset of UEs for CSI reporting can be from the subset of UEs in the UE group that are RRC_CONNECTED. Also, to ensure that all UEs in a UE group receive data through pre-coder cycling regardless of them being in RRC_CONNECTED or RRC_IDLE modes, eNB can repeat pre-coder cycling associated with a CSI report multiple times in time domain. Additionally, when the eNB is aware of the UE switching periods between RRC_IDLE and RRC_CONNECTED, it can schedule the precoding cycling repetitions to ensure all UEs in the group receive the multicast transmissions.

In addition to the WB and long-term precoder matrix indicator (PMI) feedback, the configured subset of UEs can also be configured to report a SB or WB channel quality indicator (CQI) for modulation and coding scheme (MCS) selection. The subset of UEs reporting may or may not the same as the subset of UEs reporting PMI. For example, eNB may configure a smaller subset of UEs for PMI and CQI reporting and larger subset of UEs for PMI reporting or vice versa. Finally, the UE may or may not be configured to report RI. When they are not configured to report RI, then the UEs assume a fixed rank indicator (RI) for PMI (and CQI) reporting. The fixed rank can be 1. Alternatively, when they are configured to report RI, then the reported RI can be upper bounded by a maximum reported rank.

In some embodiments, V2X UEs in a group are configured with either non-precoded (NP) or beam-formed (BF) CSI-RS resources for CSI reporting. Depending on the CSI-RS types, each UE is also configured with a CSI reporting type or eMIMO-Type. For example, the configured eMIMO-Type is 'Class A' for NP CSI-RS and is 'Class B' for BF CSI-RS. In case of BF CSI-RS, UEs can be configured with K resources where K≥1. In case of Class B eMIMO-Type associated with BF CSI-RS, eNB applies pre-coder cycling across ports by applying different pre-coders at $N_p$ Class B ports. For example, eNB can cycle through four pre-coders using $N_p$=8 Class B ports.

When UEs are configured with NP CSI-RS and Class A eMIMO-Type, they report $W_1$ beam group or $1^{st}$ PMI ($i_{1,1}$, $i_{1,2}$), CQI, and RI in the CSI report according to some embodiments of the present disclosure.

When UEs are configured with BF CSI-RS with K=1 resources and Class B eMIMO-Type, and they report CQI/RI as CSI feedback (i.e. no PMI is reported). When UEs are configured with BF CSI-RS with K>1 resources and Class B eMIMO-Type, and the UEs report CRI as CSI feedback in addition to CQI/RI, where CRI can be derived in LTE FD-MIMO or eFD-MIMO. Using the reported CRI from a subset of UEs, the eNB performs open-loop pre-coder cycling.

In some embodiments, a UE is configured with a new eMIMO-Type 'Class C' for semi-open-loop based pre-coder cycling, which can be associated with either NP or BR CSI-RS. If Class C eMIMO-Type is associated with NP CSI-RS, then the UE reports $W_1$ beam group or $1^{st}$ PMI ($i_{1,1}$, $i_{1,2}$), CQI, and RI in the CSI report. Alternatively, it is associated with BF CSI-RS, then the UE reports CQI and RI (and also CRI if configured with K>1 BF CSI-RS resources).

In some embodiments, a UE is configured with a hybrid CSI-RS resource and CSI reporting for semi-open-loop based pre-coder cycling. In this hybrid configuration, there are two NZP CSI-RS resources (both NP, both BF, or one NP and the other BF) associated with two eMIMO-Types, and are configured in a single or two different CSI processes.

In one example, the first NZP CSI-RS resource is NP and is associated with Class A eMIMO-Type, and the second NZP CSI-RS resource is BF with K=1 resource and is associated with Class B eMIMO-Type or a new 'Class C' eMIMO-Type. Using the first CSI-RS resource, the UE derives $W_1$ beam group or $1^{st}$ PMI ($i_{1,1}$, $i_{1,2}$), and RI and reports them as first CSI associated with the Class A eMIMO-Type. The eNB uses the reported $W_1$ beam group to implement pre-coder cycling by beam-forming $N_p$ Class B ports and associates them with the second CSI-RS resource. The UE uses the second CSI-RS to derive CQI and RI as second CSI associated with the Class B or Class C eMIMO-Type.

In another example, the first CSI-RS and eMIMO-Type are the same as in the first example. In the second stage, the eNB applies space frequency block coding (SFBC) using the $W_1$ beam group reported in the first CSI, and the UE reports CQI and RI as the second CSI associated with Class B or Class C eMIMO-Type.

In yet another example, hybrid configuration for semi-open-loop based pre-coder cycling can be constructed similarly.

Figure 16:
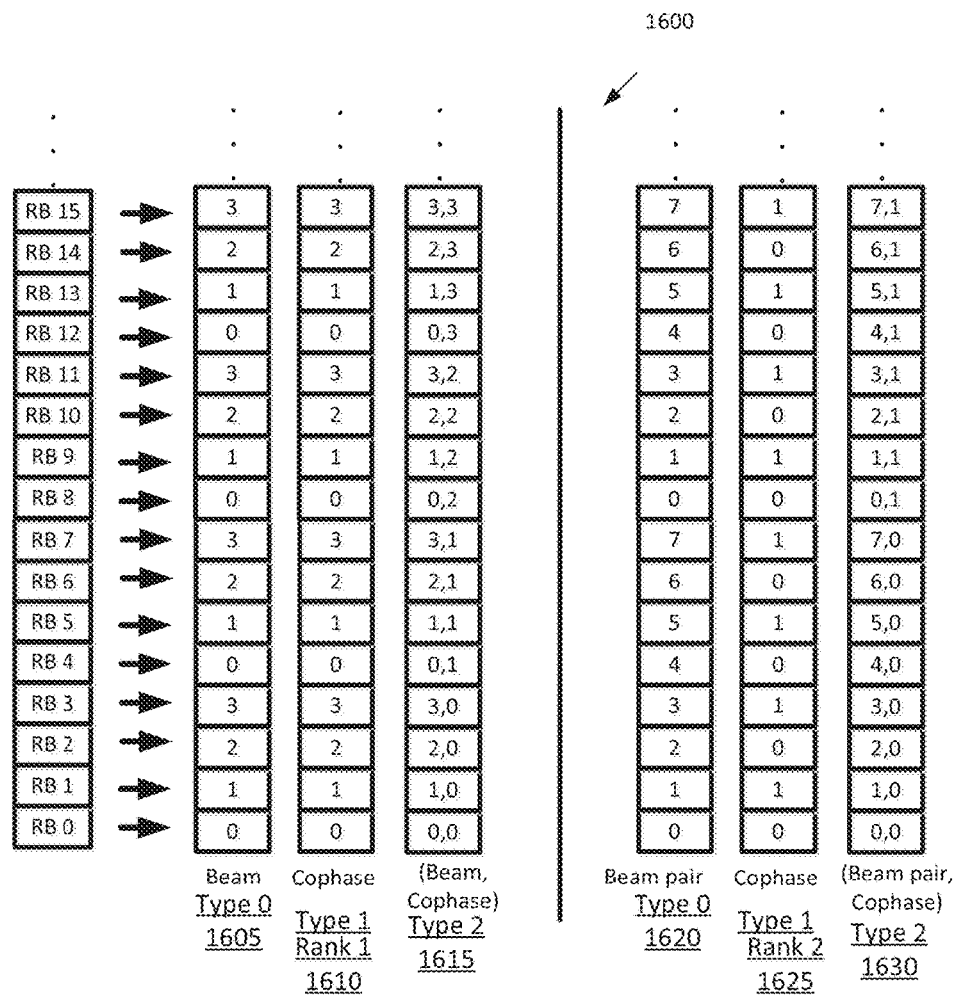
FIG. 16 illustrates an example resource block (RB) level cycling according to embodiments of the present disclosure.

FIG. 16 illustrates an example resource block (RB) level cycling 1600 according to embodiments of the present disclosure. An embodiment of the RB level cycling 1600 shown in FIG. 16 is for illustration only. Other embodiments may be used without departing from the scope of the present disclosure. As shown in FIG. 16, the RB level cycling 1600 comprises a beam type 0 1605, a cophase type 1 1610, a beam and cophase type 2 1615, a beam pair type 0 1620, a cophase type 1 1625, and a beam pair and cophase type 2 1630.

In some embodiments, the transmission scheme for pre-coder cycling belongs to one of the following three types depending on whether one or both of beams and co-phase values (for the two polarizations) are cycled through TABLE 3. In one example of Type 0, L beams (reported by the UE) are cycled through by the eNB without any co-phase cycling. In this method, the co-phase (for the two polarizations) for each of L beams is either fixed, or is reported by the UE, where this reporting is WB. In another example of Type 1, K co-phase values are cycled through by the eNB without any beam cycling. In this method, the beam is either fixed, or is reported by the UE, where this reporting is WB. In yet another example of Type 2, both L beams (reported by the UE) and K co-phase values are cycled through by the eNB.

TABLE 3

| Cycling type | Beam cycling | Co-phase cycling |
|---|---|---|
| 0 | Yes | No |
| 1 | No | Yes |
| 2 | Yes | Yes |

In one example, regardless of the number of beams (L value) indicated by $W_1$ reporting, the co-phase values for rank 1 pre-coder cycling belong to QPSK codebook, i.e., $$\left\{ \begin{bmatrix} 1 \\ 1 \end{bmatrix} \begin{bmatrix} 1 \\ j \end{bmatrix} \begin{bmatrix} 1 \\ -1 \end{bmatrix} \begin{bmatrix} 1 \\ -j \end{bmatrix} \right\} (K = 4)$$

and that for rank 2 pre-coder cycling belong to $$\left\{ \begin{bmatrix} 1 & 1 \\ 1 & -1 \end{bmatrix}, \begin{bmatrix} 1 & 1 \\ j & -j \end{bmatrix} \right\} (K = 2).$$

In another example, the co-phase codebook for rank 1 and rank 2 pre-coder cycling depends on the number of beams (L value). For instance, for L=1, 2, and 4, the co-phase codebooks for rank 1 and rank 2 are $$\left\{ \begin{bmatrix} 1 \\ 1 \end{bmatrix} \begin{bmatrix} 1 \\ j \end{bmatrix} \begin{bmatrix} 1 \\ -1 \end{bmatrix} \begin{bmatrix} 1 \\ -j \end{bmatrix} \right\} (K = 4) \text{ and } \left\{ \begin{bmatrix} 1 & 1 \\ 1 & -1 \end{bmatrix}, \begin{bmatrix} 1 & 1 \\ j & -j \end{bmatrix} \right\} (K = 2),$$

(K=2), respectively, and for L=8, they are $$\left\{ \begin{bmatrix} 1 \\ 1 \end{bmatrix} \begin{bmatrix} 1 \\ -1 \end{bmatrix} \right\} (K = 2) \text{ and } \left\{ \begin{bmatrix} 1 & 1 \\ 1 & -1 \end{bmatrix} \right\} (K = 1)$$

respectively. For the three pre-coder cycling types as shown in TABLE 3, the pre-coder cycling scheme can be according to one of the following examples.

In one example of RB level cycling, the pre-coder is cycled across RBs where, for example, an RB comprises of 12 consecutive subcarriers and 14 consecutive OFDM symbols as in LTE. For example, in a given subframe n, RB 0 can be associated with pre-coder 0 (i.e., pre-coder 0 is applied at all REs in RB 0), RB 1 can be associated with pre-coder 1, and so on. An illustration of RB level cycling for cycling types 0-2 and ranks 1 and 2 is shown in FIG. 16 for L=4 beams indicated by $W_1$ feedback, and 4 co-phase values for rank 1 and 2 co-phase values for rank 2. For rank 2, 8 rank beam pairs are considered out of 4 beams. An example of 8 beam pairs is Rel. 10 8-Tx rank 2 beam pairs: {(0,0), (1,1), (2,2), (3,3), (0,1), (1,2), (0,3), (1,3)}. In this example, for cycling type 2, beams are cycled first in consecutive RBs, followed by co-phase cycling. In an alternative example, co-phase values can be cycled first in consecutive RBs, followed by beam cycling. The RB level cycling for other L values (e.g. L=1, 2, and 8) and other co-phase codebooks is similar.

Figure 17:
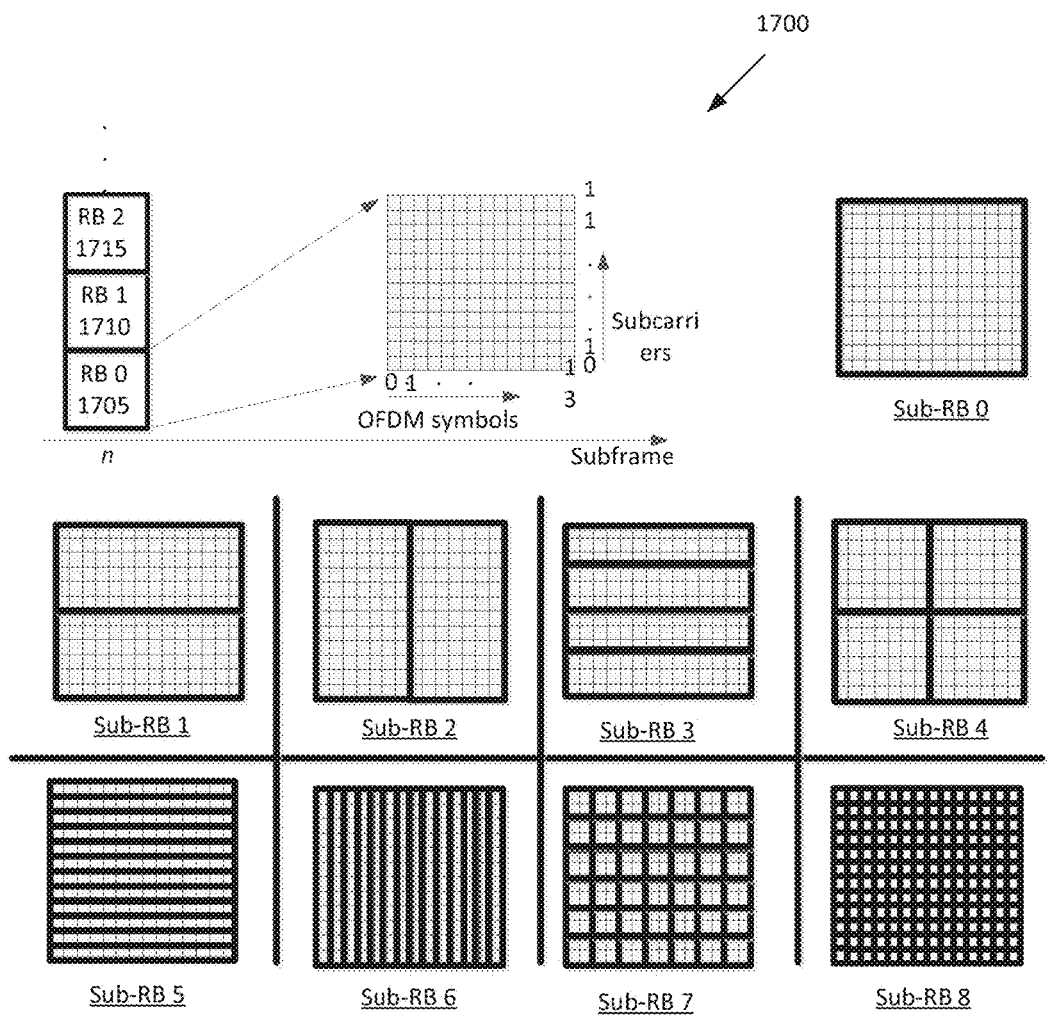
FIG. 17 illustrates an example sub-RBs according to embodiments of the present disclosure.

In another example of sub-RB level cycling, the pre-coder is cycled across sub-RBs where, for example, a sub-RB comprises of k consecutive subcarriers and t consecutive OFDM symbols. For example, in a given subframe n, sub-RB 0 can be associated with pre-coder 0 (i.e., pre-coder 0 is applied at all REs in sub-RB 0), sub-RB 1 can be associated with pre-coder 1, and so on. A few examples of sub-RBs are shown in FIG. 17 as bold black rectangles. The details about the number of REs in a sub-RB and the number of sub-RBs in an RB are tabulated in TABLE 4. Note that Sub-RB 0 corresponds to an example in which a sub-RB is equivalent to an RB. So, the example Sub-RB 0 corresponds to RB level cycling. Similarly, Sub-RB 8 corresponds to an example in which a sub-RB is equivalent to an RE. So, the example Sub-RB 8 corresponds to RE level cycling.

FIG. 17 illustrates an example sub-RBs 1700 according to embodiments of the present disclosure. An embodiment of the sub-RBs 1700 shown in FIG. 17 is for illustration only. Other embodiments may be used without departing from the scope of the present disclosure. As shown in FIG. 17, the sub-RBs 1700 comprises an RB 0 1705, an RB 1 1710, and an RB 2 1715. TABLE 4 shows different sub-RBs as shown in FIG. 17.

TABLE 4

| Examples | Number of subcarriers (k) | Number of OFDM symbols (t) | Number of REs in a sub-RB (k × t) | Number of sub-RBs in an RB |
|---|---|---|---|---|
| Sub-RB 0 | 12 | 14 | 168 | 1 |
| Sub-RB 1 | 6 | 14 | 84 | 2 |
| Sub-RB 2 | 12 | 7 | 84 | 2 |
| Sub-RB 3 | 3 | 14 | 42 | 4 |
| Sub-RB 4 | 6 | 7 | 42 | 4 |
| Sub-RB 5 | 1 | 14 | 14 | 12 |
| Sub-RB 6 | 12 | 1 | 12 | 14 |
| Sub-RB 7 | 2 | 2 | 4 | 42 |
| Sub-RB 8 | 1 | 1 | 1 | 168 |

Figure 18:
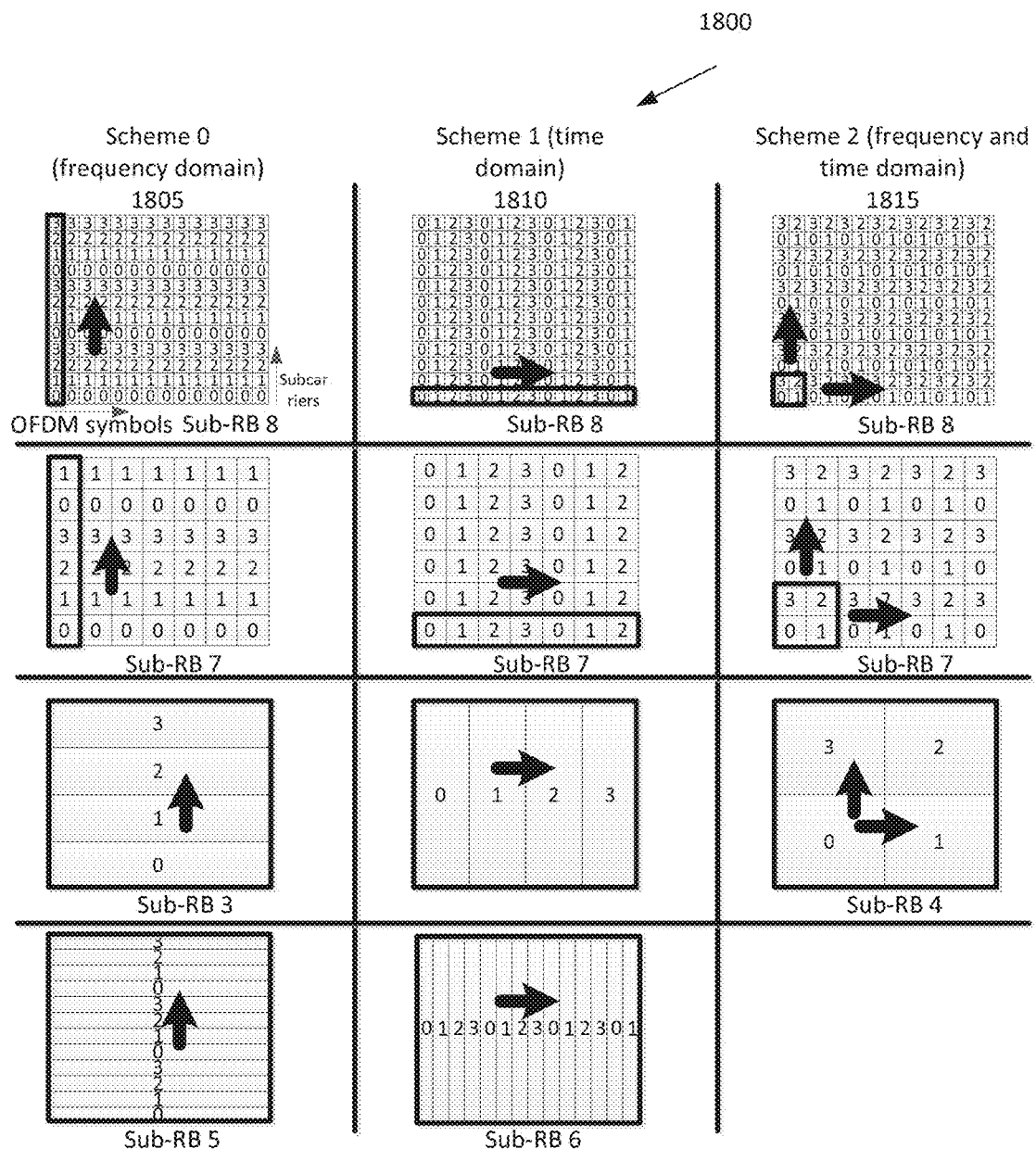
FIG. 18 illustrates an example pre-coder cycling type 0 and 1 for sub-RB level cycling according to embodiments of the present disclosure.

FIG. 18 illustrates an example pre-coder cycling type 0 and 1 for sub-RB level cycling 1800 according to embodiments of the present disclosure. An embodiment of the pre-coder cycling type 0 and 1 for sub-RB level cycling 1800 shown in FIG. 18 is for illustration only. Other embodiments may be used without departing from the scope of the present disclosure. As shown in FIG. 18, the pre-coder cycling type 0 and 1 for sub-RB level cycling 1800 comprises a scheme 0 1805, a scheme 1 1810, and a scheme 2 1815. For sub-RB level cycling, there are at least the following three types of cycling direction schemes depending on whether cycling is in one or both of frequency and time domains. In one example of cycling direction scheme 0 (Frequency domain), cycling is only in frequency domain (across subcarriers) and cycling patterns remain the same in time domain (across OFDM symbols). In another example of cycling direction scheme 1 (Time domain), cycling is only in time domain (across OFDM symbols) and cycling patterns remain the same in frequency domain (across subcarriers). In yet another example of cycling direction scheme 2 (Frequency and time domain), cycling in both frequency (across subcarriers) and time (across OFDM symbols) domains.

For pre-coder cycling type 0 and 1 (beam or co-phase cycling only), there may be three cycling direction schemes. For pre-coder cycling type 2 (both beam and co-phase cycling), however, cycling direction schemes for beam and co-phase cycling may or may not be the same. Accordingly, there may be nine different schemes in total. The details about different cycling direction schemes are summarized in TABLE 5.

TABLE 5

| Cycling type | Beam cycling direction | Co-phase cycling direction |
|---|---|---|
| 0 | Scheme 0 | — |
|   | Scheme 1 | — |
|   | Scheme 2 | — |
| 1 | — | Scheme 0 |
|   | — | Scheme 1 |
|   | — | Scheme 2 |
| 2 | Scheme 0 | Scheme 0 |
|   | Scheme 0 | Scheme 1 |
|   | Scheme 0 | Scheme 2 |
|   | Scheme 1 | Scheme 0 |
|   | Scheme 1 | Scheme 1 |
|   | Scheme 1 | Scheme 2 |
|   | Scheme 2 | Scheme 0 |
|   | Scheme 2 | Scheme 1 |
|   | Scheme 2 | Scheme 2 |

For pre-coder cycling types 0 and 1 (beam or co-phase cycling only), and for cycling direction schemes 0-2, a few examples of rank 1 pre-coder cycling are shown in FIG. 18. The indices 0-3 in the figure correspond to 4 beams (cycling type 0) or 4 co-phase values (cycling type 1). The direction (or domain) of beam or co-phase cycling is shown using bold arrows. If a sub-RB is associated with a beam or co-phase index i, then the corresponding beam or co-phase is applied at all REs within that sub-RB. Similar examples can be constructed for rank 2 pre-coder cycling, for example, by considering beam pair indices 0-7 and rank 2 co-phase indices 0-1.

Figure 19:
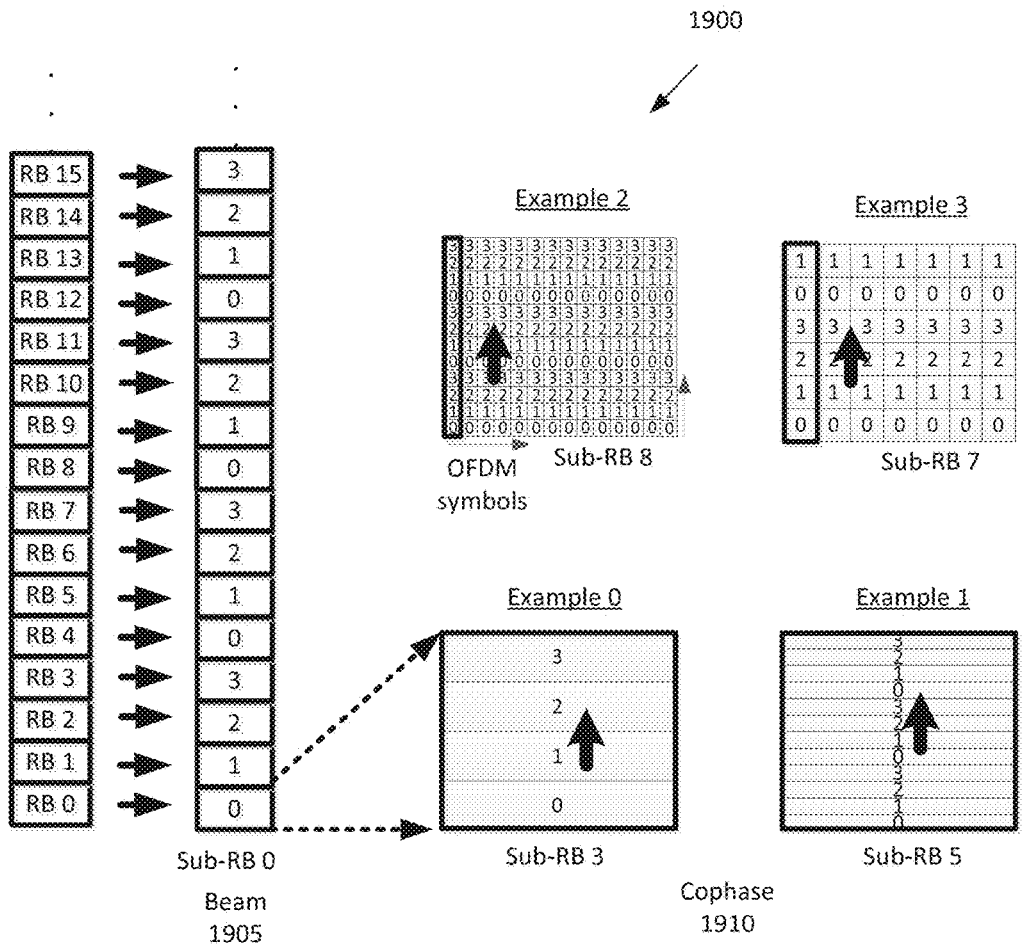
FIG. 19 illustrates an example pre-coder cycling type 2 according to embodiments of the present disclosure.
Figure 20:
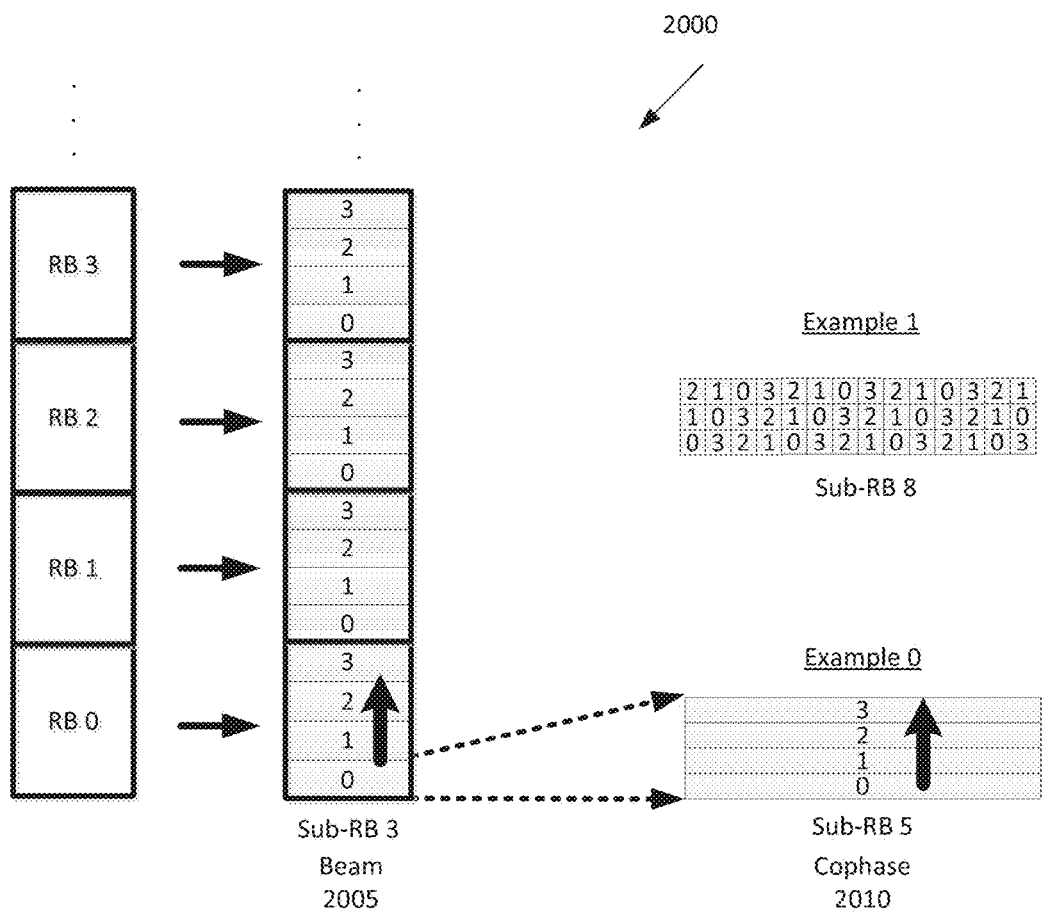
FIG. 20 illustrates another example pre-coder cycling type 2 according to embodiments of the present disclosure.

For pre-coder cycling type 2 (both beam and co-phase cycling), and for cycling direction scheme 0 (frequency domain cycling), a few examples of rank 1 pre-coder cycling are shown in FIG. 19 and FIG. 20.

FIG. 19 illustrates an example pre-coder cycling type 2 1900 according to embodiments of the present disclosure. An embodiment of the pre-coder cycling type 2 1900 shown in FIG. 19 is for illustration only. Other embodiments may be used without departing from the scope of the present disclosure. As shown in FIG. 19, the pre-coder cycling type 2 1900 comprises a beam 1905 and a cophase 1910. As shown in FIG. 19, RB level (sub-RB 0) beam cycling and sub-RB 3, 5, 7, and 8 level co-phase cycling for rank 1 is depicted.

FIG. 20 illustrates another example pre-coder cycling type 2 2000 according to embodiments of the present disclosure. An embodiment of the pre-coder cycling type 2 2000 shown in FIG. 20 is for illustration only. Other embodiments may be used without departing from the scope of the present disclosure. As shown in FIG. 20, the pre-coder cycling type 2 2000 comprises a beam 2005 and a cophase 2010. FIG. 20 shows examples for sub-RB 3 level beam cycling and sub-RB 5 and 8 level co-phase cycling for rank 1. Examples for RB level co-phase cycling and sub-RB level beam cycling can be constructed similarly by swapping the beam and co-phase indices. Similarly, for rank 2 and pre-coder cycling direction schemes 1 and 2, examples can be constructed.

Figure 21:
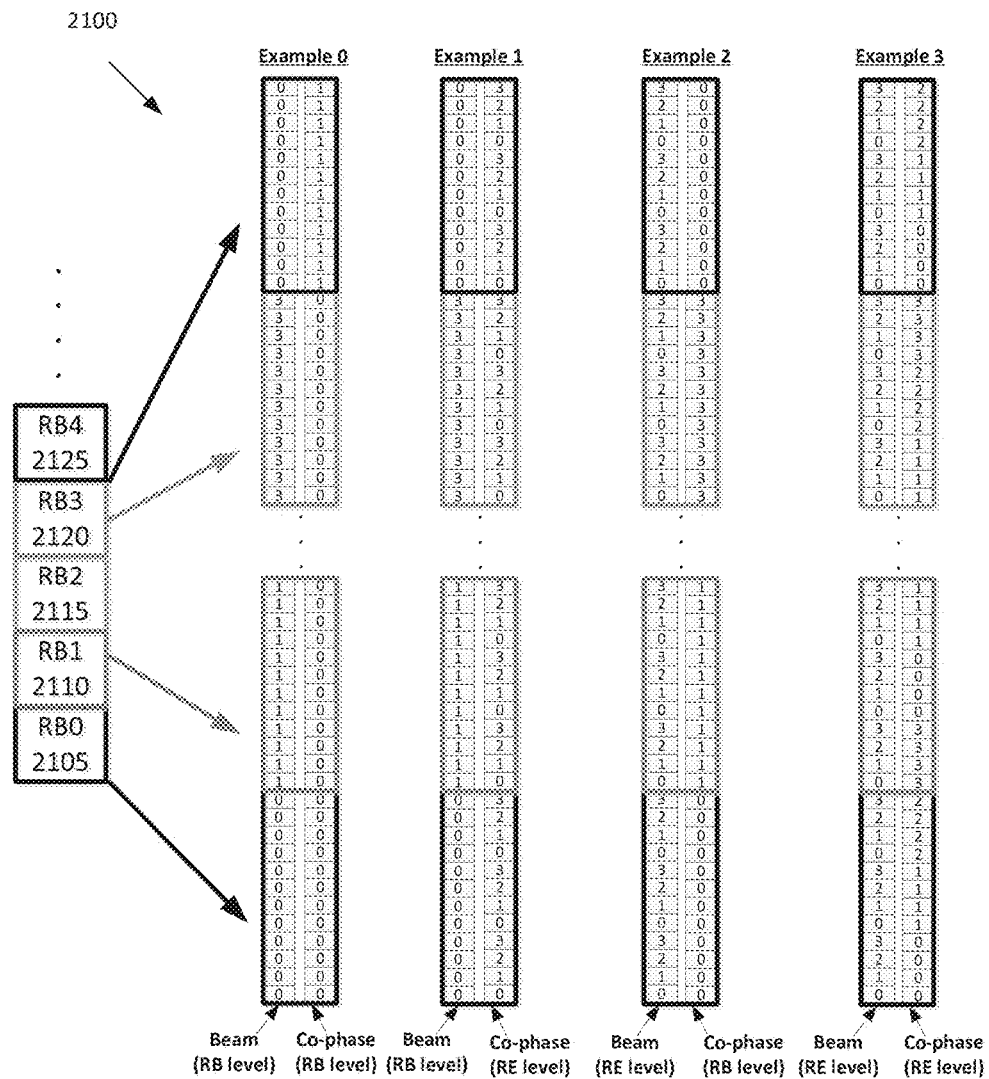
FIG. 21 illustrates yet another example pre-coder cycling type 2 according to embodiments of the present disclosure.

FIG. 21 illustrates yet another example pre-coder cycling type 2 2100 according to embodiments of the present disclosure. An embodiment of pre-coder cycling type 2 2100 shown in FIG. 21 is for illustration only. Other embodiments may be used without departing from the scope of the present disclosure. As shown in FIG. 21, the pre-coder cycling type 2 2100 comprises an RB 0 2105, an RB 1 2110, an RB 2 2115, an RB 3 2120, and an RB 4 2125. In some embodiments, the pre-coder cycling is according to one of the four examples in TABLE 6. In these examples, the beam and co-phase cycling is either RB level (Sub-RB 0) or RE level (Sub-RB 8). An illustration of rank 1 pre-coder cycling for L=4 beams and K=4 co-phase values is shown in FIG. 21 assuming cycling direction scheme 0 (frequency domain). For simplicity, pre-coder cycling only across one OFDM symbol is shown in the figure. The pre-coder cycling is the same in other OFDM symbols within a RB.

TABLE 6

| Examples | Beam cycling | Co-phase cycling |
|---|---|---|
| 0 | RB level (Sub-RB 0) | RB level (Sub-RB 0) |
| 1 | RB level (Sub-RB 0) | RE level (Sub-RB 8) |
| 2 | RE level (Sub-RB 8) | RB level (Sub-RB 0) |
| 3 | RE level (Sub-RB 8) | RE level (Sub-RB 8) |

Figure 22:
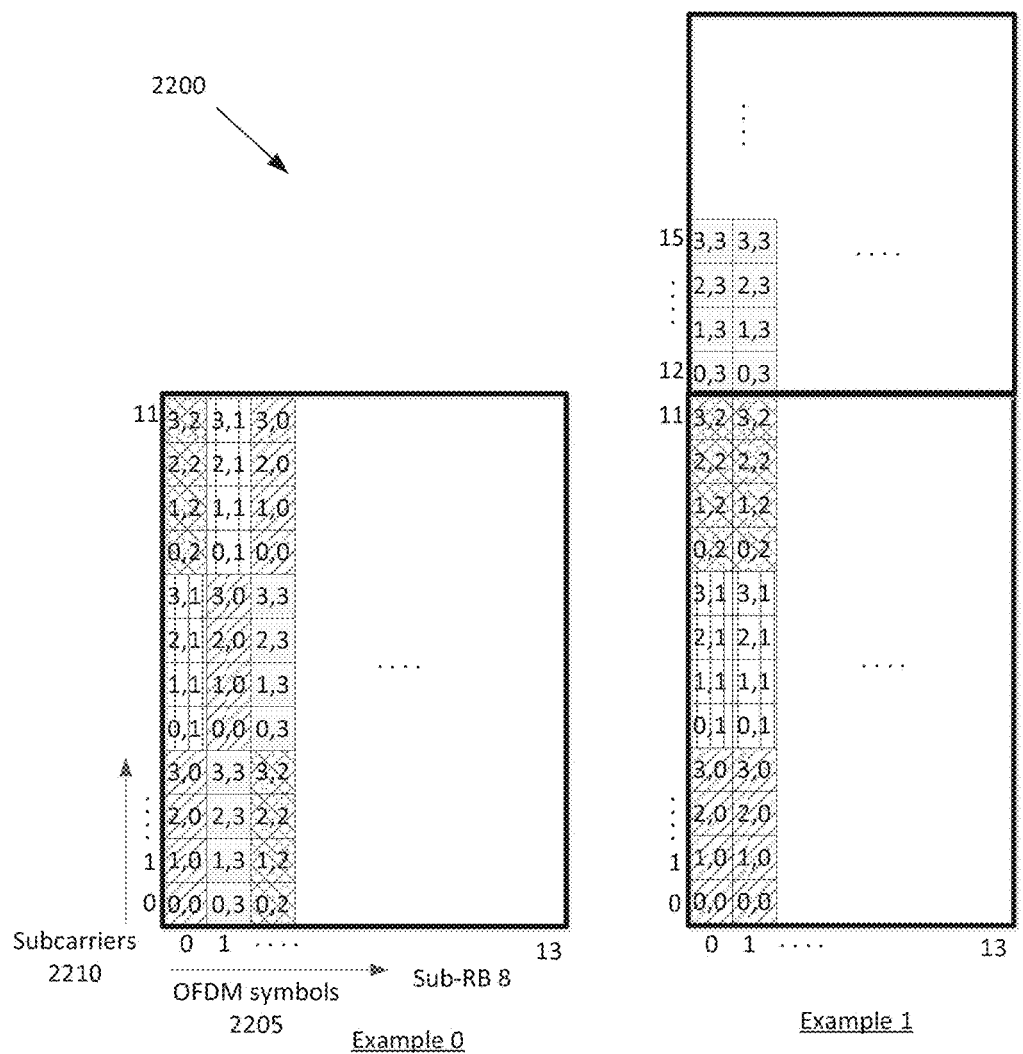
FIG. 22 illustrates an example pre-coder cycling according to embodiments of the present disclosure.

FIG. 22 illustrates an example pre-coder cycling 2200 according to embodiments of the present disclosure. An embodiment of the pre-coder cycling 2200 shown in FIG. 22 is for illustration only. Other embodiments may be used without departing from the scope of the present disclosure. As shown in FIG. 22, the pre-coder cycling 2200 comprises OFDM symbols 2205 and subcarriers 2210. In some embodiments of sub-RB 8 (RE level cycling), if the number of pre-coders to be cycled is more than the number of subcarriers (k) in an RB (or in a Sub-RB in general), then the pre-coder cycling is according to one of the following two examples as shown in FIG. 22. In one example, the RE level cycling is constrained to be within an RB. For example, the first 12 pre-coders are applied at subcarriers 0 to 11 of the $1^{st}$ OFDM symbol of the RB (or sub-RB), and remaining 4 pre-coders are applied to subcarriers 0 to 3 of the $2^{nd}$ OFDM symbol. The pre-coder cycling continues in this manner at the rest of the REs in an RB. Similar RE level pre-coder cycling is applied at all RBs. In another example, the RE level cycling is not constrained to be within an RB. For example, the remaining 4 pre-coders are applied at subcarriers 12-15 in the next RB. In this example, the same pre-coder cycling pattern is repeated across OFDM symbols, as shown.

In some embodiments, a pre-coder cycling scheme may be used by the eNB in a UE-transparent manner such that the UE is unaware of the specific pre-coder cycling scheme used by the eNB. The UE is only configured to report the CSI feedback (i.e., $W_1$ beam group, CQI, RI) necessary for pre-coder cycling. For example, the UE may derive the CQI based on the average SINR computed by averaging SINR values corresponding to all per-coders (that can be constructed from the reported $W_1$ beam group) conditioned on a RI value or the last reported RI.

In some embodiments, a pre-coder cycling scheme may be used by the eNB in a UE-non-transparent manner such that the UE is configured with additional details such as the pre-coder cycling transmission scheme and DMRS. This configuration is via higher-layer RRC signaling for example. The UE derives SINR for CQI feedback based on the pre-coder cycling transmission scheme, and performs demodulation based on the information about DMRS and pre-coder cycling scheme. In particular, the UE may derive channel measurements for computing the CQI value based on the CSI-RS configuration (NP or BF) and eMIMO-Type (Class A or Class B). For CQI computation, the UE may compute average SINR for a given rank or conditioned on the last reported rank, where the averaging depends on the pre-coder cycling scheme applied at the eNB.

In one example, if the CQI computation is per SB with SB size of 4 RBs, then for RB level pre-coder cycling, the UE may assume a single pre-coder applied at all REs in an RB and compute 4 SINR values corresponding to 4 RBs and average them in order to compute SINR calculation for CQI computation.

In another example, if the CQI computation is per SB with SB size of 4 RBs, then for RE level pre-coder cycling, the UE may assume all pre-coders that are cycled through in an RB to compute average SINR for each RB, where this averaging is over the number of pre-coders that are cycled through in an RB, and then averages the 4 SINRs for 4 RBs in order to compute SINR calculation for CQI computation.

In yet another example, if the CQI computation is per SB with SB size of 4 RBs, then for Sub-RB level pre-coder cycling, the UE may assume all pre-coders that are cycled through in a Sub-RB to compute average SINR for each RB, where this averaging is over both the number of pre-coders that are cycled through in a Sub-RB and the number of Sub-RBs comprising an RB, and then averages the 4 SINRs for 4 RBs in order to compute SINR calculation for CQI computation.

In some embodiments, a UE is configured with a pre-coder cycling based transmission scheme using a 1-bit RRC parameter where the specific pre-coder cycling scheme is fixed in the specification, for example, RB level beam cycling and RE level co-phase cycling (as shown in FIG. 21). An example of transmission scheme configuration table is shown in TABLE 7.

TABLE 7

| RRC Parameter Value | Transmission scheme |
| --- | --- |
| 0 | Closed loop |
| 1 | Pre-coder cycling (RB level beam cycling and RE level co-phase cycling) |

In some embodiments, a UE is configured with a pre-coder cycling based transmission scheme using a 2-bit RRC parameter where one of the three pre-coder cycling schemes can be configured. An example of transmission scheme configuration table is shown in TABLE 8.

TABLE 8

| RRC Parameter Value | Transmission scheme |
| --- | --- |
| 0 | Closed loop |
| 1 | Pre-coder cycling (RB level beam cycling and RB level co-phase cycling) |
| 2 | Pre-coder cycling (RB level beam cycling and RE level co-phase cycling) |
| 3 | Pre-coder cycling (RE level beam cycling and RE level co-phase cycling) |

In some embodiments, a UE is configured with the pre-coder cycling granularity for beam or/and co-phase. For example, for pre-coder cycling type 0 and 1, a 1-bit configuration (e.g. via RRC parameter) is used to configure RB or RE level cycling of beam or co-phase. Similarly, for pre-coder cycling type 2, a 2-bit configuration (e.g. via RRC parameter) is used to configure RB or RE level cycling of beam and co-phase. Alternatively, for pre-coder cycling type 2 also, a 1-bit configuration (e.g. via RRC parameter) is used to configure RB or RE level cycling of co-phase, and the beam cycling in this example is fixed, for example, to RB level. The UE can be configured with other pre-coder cycling granularities such as Sub-RB 0-Sub-RB 8 (as shown in FIG. 18).

In some embodiments, a UE is configured with multiple DMRS sequences depending on the specific pre-coder cycling type and Sub-RB. In this table, for pre-coder cycling types 2, one of beam and co-phase cycling is Sub-RB level and the other is fixed to RE level. The details about the number of DMRS sequences (for rank 1 with 4 beams and 4 co-phase values) for Sub-RB 0-8 as shown in FIG. 17 are tabulated in TABLE 9.

Note that the maximum number of DMRS sequences for pre-coder cycling types 0 and 1 is 4, however, that for pre-coder cycling type 2 is 16. In this later case, if the maximum number of DMRS sequences that the UE can be configured with is 4, then the PRB bundling can be applied for DMRS based channel estimation for demodulation. In this case, the number of PRBs that need to be bundled is shown in TABLE 9.

TABLE 9

| | Cycling Type 0, 1 (Sub-RB level cycling): Number of DMRS | Cycling Type 2 (Sub-RB level cycling, RE level cycling) | |
| --- | --- | --- | --- |
| Examples | | Number of DMRS | PRB bundling (assuming 4 DMRS per PRB) |
| Sub-RB 0 | 1 | 4 | 1 |
| Sub-RB 1 | 2 | 8 | 2 |
| Sub-RB 2 | 2 | 8 | 2 |
| Sub-RB 3 | 4 | 16 | 4 |
| Sub-RB 4 | 4 | 16 | 4 |
| Sub-RB 5 | 4 | 16 | 4 |
| Sub-RB 6 | 4 | 16 | 4 |
| Sub-RB 7 | 4 | 16 | 4 |
| Sub-RB 8 | 4 | 16 | 4 |

In some embodiments, the PRB bundling for DMRS channel estimation is fixed. In one example, a UE may assume that PRB bundling is always ON whenever it is configured with semi-open-loop based pre-coder cycling (e.g. transmission scheme or/and CSI feedback) regardless of the pre-coder cycling granularities such as RB level cycling, RE level cycling and sub-RB level cycling. In another example, a UE may assume that PRB bundling is turned ON or OFF depending on the configured Sub-RB for pre-coder cycling. For instance, the UE may assume that PRB bundling is ON for RE level (beam or/and co-phase) cycling (Sub-RB 8), and it is turned OFF for RB level (beam or/and co-phase) cycling (Sub-RB 0). In yet another example, the PRB bundling is fixed, for example to 4 PRBs. In yet another example, the PRB bundling is fixed to the subband size depending on the system BW.

In some embodiments, the PRB bundling for DMRS channel estimation is configured (e.g. via RRC signaling). In one example, this configuration is explicit. For example, the UE is configured with PRB bundling using 1-bit RRC parameter PRBBundlingEnabled. Whenever PRBBundlingEnabled is turned ON, the UE may assume the PRB bundling (fixed or RRC configurable) for DMRS channel estimation. Alternatively, 2-bit RRC parameter PRBBundlingEnabled is used to configure PRB bundling of PRB sizes 1, 2, 3, and 4. In another example, it is implicit and, for example, depends on the DMRS configuration for semi-open-loop based pre-coder cycling. If the UE is configured with semi-open-loop based pre-coder cycling. In such example, the number of DMRS is needed for pre-coder cycling at most 4, then the UE may assume either no PRB bundling or PRB bundling. In such example, the number of DMRS is needed for pre-coder cycling more than 4 and at most 8, then the UE may assume PRB bundling of size 2 PRBs. In such example, the number of DMRS is needed for pre-coder cycling more than 8 and at most 16, then the UE shall assume PRB bundling of size 4 PRBs.

Figure 23:
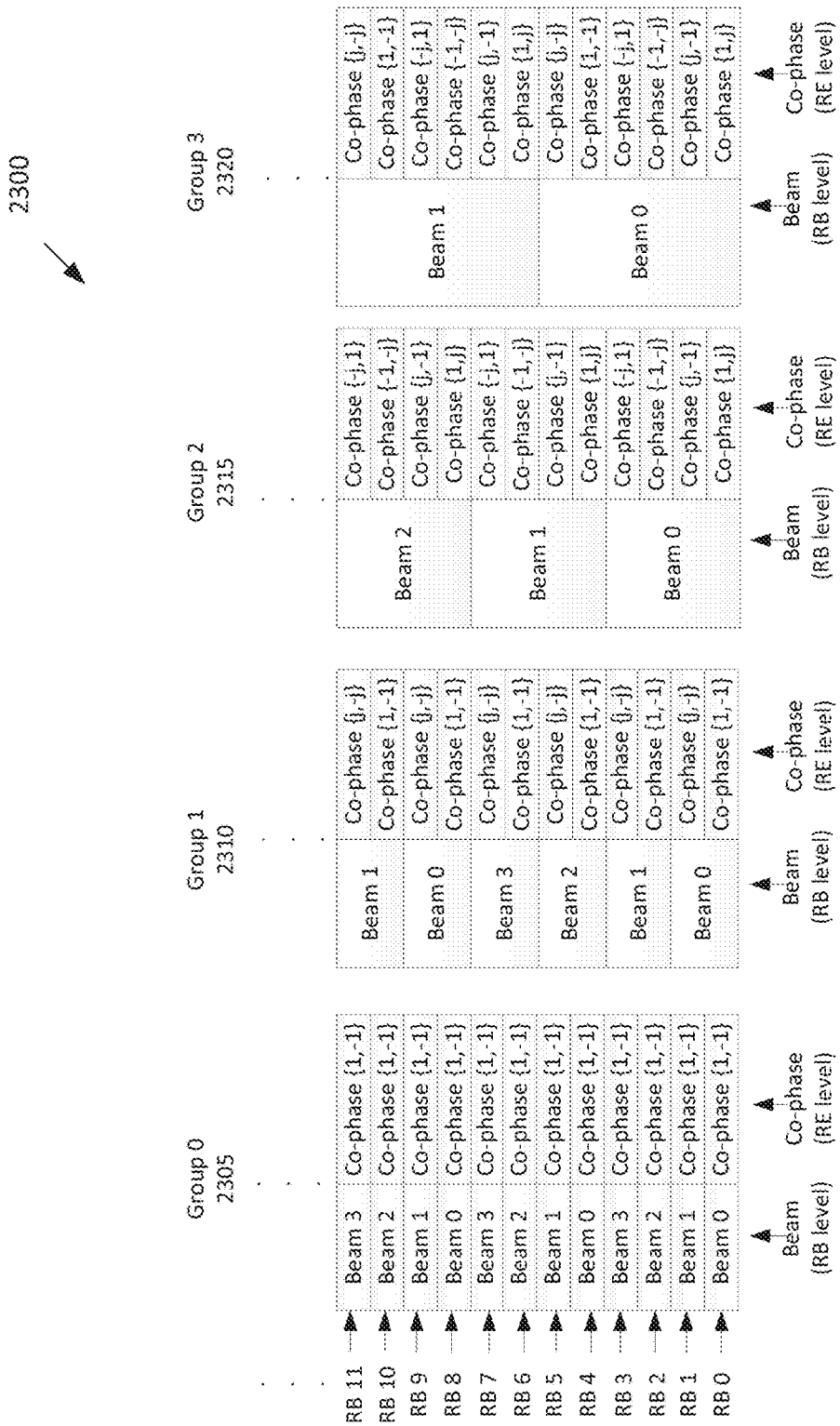
FIG. 23 illustrates an example resource element (RE) level co-phase cycling of two co-phase values in an RB according to embodiments of the present disclosure.

FIG. 23 illustrates an example resource element (RE) level co-phase cycling of two co-phase values in an RB 2300 according to embodiments of the present disclosure. An embodiment of the RE level co-phase cycling of two co-phase values in an RB 2300 shown in FIG. 23 is for illustration only. Other embodiments may be used without departing from the scope of the present disclosure. As shown in FIG. 23, the resource element (RE) level co-phase cycling of two co-phase values in an RB 2300 comprises a group 1-0 2305, a group 2 2310, a group 3 2315, and a group 4 2320.

TABLE 10 shows some groups of RE level cycling of 2 co-phase values.

Note that the rank-1 co-phase for the two polarizations can be expressed as $$\begin{bmatrix} 1 \\ \phi_n \end{bmatrix}$$

where 1 is multiplied to the beam or pre-coder for one polarization (e.g. +45) and $\phi_n$ is multiplied to the beam or pre-coder for the other polarization (e.g. −45). In other words, assuming the same beam or pre-coder, b, is used at both polarizations, the rank-1 pre-coder is given by $$\begin{bmatrix} b \\ \phi_n b \end{bmatrix}.$$

Similarly, the rank-2 co-phase for the two polarizations can be expressed as $$\begin{bmatrix} 1 & 1 \\ \phi_{n_1} & \phi_{n_2} \end{bmatrix}$$

where $\phi_{n_1}$ and $\phi_{n_2}$ are two multipliers to the other polarization (e.g. −45) for the two layers. In other words, assuming the same beam or pre-coder, b, is used at both polarizations and for both layers, the rank-2 pre-coder is given by $$\begin{bmatrix} b & b \\ \phi_{n_1} b & \phi_{n_2} b \end{bmatrix}.$$

In some embodiments, since the multiplier for the first polarization (e.g. +45) is always 1 (for both rank-1 and rank-2), the multiplier for the other polarization (e.g. −45) only may be defined when we define a set of co-phase values. For example, the set of two co-phase values {x, y} implies two rank-1 co-phase $$\begin{bmatrix} 1 \\ x \end{bmatrix} \text{ and } \begin{bmatrix} 1 \\ y \end{bmatrix},$$

and one rank-2 co-phase $$\begin{bmatrix} 1 & 1 \\ x & y \end{bmatrix}.$$

TABLE 10

| Groups | W1 beams | | Co-phase values | Number of co-phase values for cycling | Number of RBs for co-phase cycling |
|---|---|---|---|---|---|
| Group 0 | RB level cycling of L beams | RE level cycling | {1, −1} | 2 co-phase values | 1 |
| Group 1 | | | {1, −1}, {j, −j} | 2 pairs of 2 co-phase values | 2 |
| Group 2 | | | {1, j}, {j, −1}, {−1, −j}, {−j, 1} | 4 pairs of 2 co-phase values | 4 |
| Group 3 | | | {1, −1}, {j, −j} {1, j}, {j, −1}, {−1, −j}, {−j, 1} | 6 pairs of 2 co-phase values | 6 |

In some embodiments, a UE is configured with a pre-coder cycling transmission scheme in which $W_1$ beams are cycled at RB level and co-phase values are cycled at RE level (as shown in FIG. 21). In particular, the number of co-phase values for RE level cycling in a given RB is two. A few examples of such rank-1 pre-coder cycling schemes are illustrated in FIG. 23 and summarized in TABLE 10 for L=4 $W_1$ beams and QPSK co-phase $\{1, j, -1, -j\}$.

In one example of group 0, four beams, beam 0-3, are cycled at RB level and two co-phase values $\{1, -1\}$ are cycled at RE level in each RB. In another example of group 1, four beams, beam 0-3, are cycled at RB level and two pairs of co-phase values $\{1, -1\}$ and $\{j, -j\}$ are cycled at RE level in two consecutive RBs, k and k+1. The co-phase values $\{1, -1\}$ are cycled in RB k and the co-phase values $\{j, -j\}$ are cycled in RB k+1. Note that the set of co-phase values changes from $\{1, -1\}$ to $\{j, -j\}$ in RBs k and k+1, respectively. Note also that in this example, the same beam is considered in RBs k and k+1, i.e., beam cycling is performed in a group of 2 consecutive RBs. In yet another example of group 2, four beams, beam 0-3, are cycled at RB level and four pairs of co-phase values $\{1, j\}$, $\{j, -1\}$, $\{-1, -j\}$, and $\{-j, 1\}$ are cycled at RE level in four consecutive RBs, k to k+3. The co-phase values $\{1, j\}$ are cycled in RB k, the co-phase values $\{j, -1\}$ are cycled in RB k+1, the co-phase values $\{-1, -j\}$ are cycled in RB k+2, and the co-phase values $\{-j, 1\}$ are cycled in RB k+3. Note that the set of co-phase values changes from RBs k to k+1, respectively. Note also that in this example, the same beam is considered in RBs k to k+3, i.e., beam cycling is performed in a group of 4 consecutive RBs. In yet another example of group 3, six pairs of co-phase values $\{1, j\}$, $\{j, -1\}$, $\{-1, -j\}$, $\{-j, 1\}$, $\{1, -1\}$, and $\{j, -j\}$ are cycled at RE level in six consecutive RBs, k to k+3. Note that in this example, the same beam is considered in RBs k to k+5, i.e., beam cycling is performed in a group of 6 consecutive RBs.

In some embodiments, group 0 and 1 are used for rank-2 pre-coder cycling schemes in which two co-phase values $\{1, -1\}$ and $\{j, -j\}$ are used for the two layers. Note that in groups 0 to 3 in aforementioned example, the required number of DMRS sequences per RB is two.

In some embodiments, for the modulation symbol index as i, RE-level PDSCH processing in the proposed semi-open-loop MIMO transmission is based on DMRS ports 7/8, where rank 1 transmission corresponds to Space Frequency Block Coding (SFBC) based transmit diversity $$\begin{bmatrix} y^{(7)}(2i) \\ y^{(7)}(2i) \\ y^{(8)}(2i+1) \\ y^{(8)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \mathrm{Re}(x^{(0)}(i)) \\ \mathrm{Re}(x^{(1)}(i)) \\ \mathrm{Im}(x^{(0)}(i)) \\ \mathrm{Im}(x^{(1)}(i)) \end{bmatrix}, \quad (1)$$

and rank 2 transmission corresponds to RE-level co-phasing cycling $$\begin{bmatrix} y^{(7)}(i) \\ y^{(8)}(i) \end{bmatrix} = \begin{bmatrix} 1 & 1 \\ \varphi_n & -\varphi_n \end{bmatrix} \begin{bmatrix} x^{(0)}(i) \\ x^{(1)}(i) \end{bmatrix}, \quad \varphi_n = e^{j\pi \mathrm{mod}(i,2)/2}. \quad (2)$$

In equations (1) and (2), $y^{(7)}$ and $y^{(8)}$ are inputs to DMRS ports 7 and 8, respectively, and $x^{(0)}$ and $x^{(1)}$ respectively are data for two layers 0 and 1 which are pre-coded using beams $b^{(0)}$ and $b^{(1)}$, respectively. Note that for rank 2, the co-phase matrix $$\begin{bmatrix} 1 & 1 \\ \phi_n & -\phi_n \end{bmatrix}$$

is either $$\begin{bmatrix} 1 & 1 \\ 1 & -1 \end{bmatrix} \text{ or } \begin{bmatrix} 1 & 1 \\ j & -j \end{bmatrix}$$

depending on whether i is even or odd, respectively. In one alternative (Alt A), the same beam is used for both layers, i.e., $b^{(0)}=b^{(1)}=b$. In another alternative (Alt B), two different beams are used for the two layers, $b^{(0)} \neq b^{(1)}$. In yet another alternative (Alt C), either the same beam or two different beams are used for the layers. Assuming 4 beams $\{p_0, p_1, p_2, p_3\}$ for pre-coding data, the LTE Rel. 13 rank 2 beam pairs belongs to $\{(p_0,p_0),(p_1,p_1),(p_2,p_2),(p_3,p_3),(p_0,p_1),(p_1,p_2),(p_0,p_3),(p_1,p_3)\}$. As an example, $(b^{(0)},b^{(1)})$ belongs to $\{(p_0,p_0),(p_1,p_1),(p_2,p_2),(p_3,p_3)\}$ for Alt A, to $\{(p_0,p_1),(p_1,p_2),(p_0,p_3),(p_1,p_3)\}$ for Alt B, and to $\{(p_0,p_0),(p_1,p_1),(p_2,p_2),(p_3,p_3),(p_0,p_1),(p_1,p_2),(p_0,p_3),(p_1,p_3)\}$ for Alt C.

In some embodiments, to report CSI for semi-open-loop transmission, the UE assumes the following pre-coding or beamforming on DMRS ports 7 and 8.

For dual-stage codebook: $W(j)=W1W2(j)$, where j denotes PRB pair index and W1 corresponds to wideband reporting of $i_1$ or $(i_{1,1}, i_{1,2})$ (e.g. grid of beams or beam group), an example of which Rel. 13 Class A rank 2 W1, the UE reports the rank 1 CSI according to one of the following options:

Option 0: SFBC without defined cycling pattern, e.g., codebook subset restriction is applied to $i_2$.

Option 1: SFBC only with fixed beam selection, e.g., belonging to Rel. 13 Class A rank 2 beam selection $\{(p_0,p_0),(p_1,p_1),(p_2,p_2),(p_3,p_3),(p_0,p_1),(p_1,p_2),(p_0,p_3),(p_1,p_3)\}$.

Option 2: SFBC with per-N-PRB-pair cycling with defined cycling pattern, where W2(j) is pre-determined set of beam selection matrices of rank-2, W2(j) corresponds to cycling per PRG which comprises of N consecutive PRB pairs, example values of N include 1, 2, 4, and size/order of beam selection matrices for cycling belongs to Rel. 13 Class A rank 2 beam selection $\{(p_0,p_0),(p_1,p_1),(p_2,p_2),(p_3,p_3),(p_0,p_1),(p_1,p_2),(p_0,p_3),(p_1,p_3)\}$.

Similarly, the UE reports the rank 2 CSI according to one of the following options:

Option 0: without defined cycling pattern, e.g., codebook subset restriction applicable to $i_2$.

Option 1: fixed beam selection, e.g., belonging to Rel. 13 Class A rank 2 beam selection $\{(p_0,p_0),(p_1,p_1),(p_2,p_2),(p_3,p_3),(p_0,p_1),(p_1,p_2),(p_0,p_3),(p_1,p_3)\}$.

Option 2: per-N-PRB-pair cycling with defined cycling pattern, where W2(j) is pre-determined set of beam selection matrices of rank-2, W2(j) corresponds to cycling per PRG which comprises of N consecutive PRB pairs, example values of N include 1, 2, 4, and size/order of beam selection matrices for cycling belongs to Rel. 13 Class A rank 2 beam selection $\{(p_0,p_0),(p_1,p_1),(p_2,p_2),(p_3,p_3),(p_0,p_1),(p_1,p_2),(p_0,p_3),(p_1,p_3)\}$.

For Single-stage codebook, W(j) is identify matrix for 2 CSI-RS ports (i.e. no PMI feedback), and is as follows for 4 CSI-ports: per-PRB-pair cycling of W(j), where W(j)=$C_k$, k=mod(j,4)+12, where $C_k$ denotes the rank-2 precoding matrix of index k.

In some embodiments, a UE is configured to report CRI and corresponding $W_1$ beam group and CQI/RI for pre-coder cycling. In such embodiments, CRI corresponds to a 1D (horizontal or vertical) or 2D spatial sector, and $W_1$ beam group feedback is used for pre-coder cycling within a sector. For example, CRI indicates a vertical sector or beam, and pre-coder cycling (based on W1 feedback) is performed in horizontal direction within the vertical sector or beam indicated by CRI.

In some embodiments, a UE is configured to report multiple, for example two, CSIs each comprising of a $W_1$ beam group, and CQI/RI for pre-coder cycling, where CSIs can be reported. In such embodiments, CSIs (beam group 0, beam group 1) are reported to only one cell. In such embodiments, CSIs are reported to their respective cells (one CSI per cell). In such embodiments, multiple or all CSIs are reported to a cell. The CSIs can be reported in the same subframe or in different subframes. Also, they can be derived independent or dependent.

In some embodiments, inter-cell co-ordination using dynamic cell selection (DCS) procedures defined for LTE co-ordinated multi-point (COMP) could be enhanced for multicasting for V2X vehicles based on the geographical location of the UEs for latency reduction. Dynamic cell selection (DCS) involves user-plane (PDSCH) transmission from one point at a time within a CoMP cooperating set and hence, fits in with PDSCH based scheduling approaches using SC-PTM for example. DCS can enable the UE to be served by the most favorable transmission cell for V2X multicasting at any given point of time. The serving cell can be selected based on geo-information transmitted by the UE. The switching between transmission points can be subframe by subframe basis and allow a dynamic change in the transmission point that is transparent to the vehicle UE with low latency.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A user equipment (UE) in a wireless communication network, the UE comprising:
at least one processor configured to identify a plurality of beams for a semi-open-loop physical downlink shared channel (PDSCH) data transmission based on at least one of a plurality of precoder cycling types, wherein a precoder comprises a beam and a co-phase, and the plurality of precoder cycling types including at least one of a beam cycling from the plurality of beams or a co-phase cycling from a plurality of co-phases; and
a transceiver configured to receive PDSCH data through the semi-open-loop PDSCH data transmission according to the at least one of the plurality of precoder cycling types,
wherein the plurality of precoder cycling types is cycled across a plurality of resource blocks (RBs) using the at least one of the beam cycling or the co-phase cycling.

2. The UE of claim 1, wherein the at least one processor is further configured to:
identify a plurality of resource elements (REs) included in the plurality of RBs;
identify each of the plurality of REs for at least one of a single RE or multiple REs level cycling period or granularity of the co-phase cycling based on the plurality of precoder cycling types; and
identify each of the plurality of RBs for at least one of a single RB or multiple RBs level cycling period or granularity of the beam cycling based on the plurality of precoder cycling types, and wherein
each of the plurality of the co-phases being cycled across each of the identified plurality of REs and each of the plurality of the beams being cycled across each of plurality of the RBs.

3. The UE of claim 2, wherein the co-phase cycling comprises at least one set of co-phase values $$\left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\}$$

for a rank 1 transmission or one set of co-phase values $$\left\{ \begin{bmatrix} 1 & 1 \\ 1 & -1 \end{bmatrix}, \begin{bmatrix} 1 & 1 \\ j & -j \end{bmatrix} \right\}$$

for a rank 2 transmission that are cycled across the plurality of REs in at least one RB of the plurality of RBs,
wherein the beam cycling comprises the plurality of beams that is cycled across at least one RB of the plurality of RBs, and
wherein the beam cycling is achieved in a single beam for rank 1 transmission or in a pair of beams for rank 2 transmission on the at least one RB of the plurality of RBs.

4. The UE of claim 2, wherein the co-phase cycling comprises at least two sets of co-phase values $$\left\{ \begin{bmatrix} 1 \\ 1 \end{bmatrix}, \begin{bmatrix} 1 \\ -1 \end{bmatrix} \right\} \text{ and } \left\{ \begin{bmatrix} 1 \\ j \end{bmatrix}, \begin{bmatrix} 1 \\ -j \end{bmatrix} \right\}$$

for a rank 1 transmission or two sets of co-phase values $$\left\{ \begin{bmatrix} 1 & 1 \\ 1 & -1 \end{bmatrix} \right\} \text{ and } \left\{ \begin{bmatrix} 1 & 1 \\ j & -j \end{bmatrix} \right\}$$

for a rank 2 transmission that are cycled across the plurality of REs in at least two consecutive RBs of the plurality of RBs,
wherein the beam cycling comprises the plurality of beams that is cycled across at least two consecutive RBs of the plurality of RBs, and
wherein the beam cycling is achieved in a single beam for rank 1 transmission or in a pair of beams for rank 2 transmission on the at least two consecutive RBs of the plurality of RBs.

5. The UE of claim 1, wherein the at least one processor is further configured to:
identify a number of demodulation reference signal (DMRS) sequences based on the plurality of precoder cycling types including the at least one of the beam cycling or the co-phase cycling;

identify a physical resource block (PRB) bundling in accordance with the number of DMRS sequences for DMRS channel estimation; and determine a number of the PRBs to be bundled based on the number of DMRS sequences.

6. The UE of claim 5, wherein the PRB bundling for the DMRS channel estimation is configured by at least one of a radio resource control (RRC) signal received from an eNodeB (eNB) or a pre-determined value.

7. The UE of claim 1, wherein:
the transceiver is further configured to transmit channel state information (CSI) including the plurality of beams for the semi-open-loop PDSCH data transmission; and
the co-phase cycling comprises at least one of:
  a cycling period, or
  a granularity from at least one of a plurality of cycling periods or granularities including at least one of a single resource element (RE), a single RB, multiple REs, or multiple RBs.

8. An eNodeB (eNB) in a wireless communication network, the eNB comprising:
a transceiver configured to receive channel state information (CSI) including a plurality of beams for a semi-open-loop physical downlink shared channel (PDSCH) data transmission; and
at least one processor is configured to perform precoder cycling for a semi-open-loop PDSCH data transmission based on at least one of a plurality of precoder cycling types, wherein a precoder comprises a beam and a co-phase, and a plurality of precoder cycling types including at least one of a beam cycling from the plurality of beams or a co-phase cycling from a plurality of co-phases,
wherein the transceiver is further configured to transmit PDSCH data through the semi-open-loop PDSCH data transmission according to the at least one of the plurality of precoder cycling types, and
wherein the plurality of precoder cycling types is cycled across a plurality of resource blocks (RBs) using the at least one of the beam cycling or the co-phase cycling.

9. The eNB of claim 8, wherein the at least one processor is further configured to:
identify a plurality of resource elements (REs) included in the plurality of RBs;
identify each of the plurality of REs for at least one of a single RE or multiple REs level cycling period or granularity of the co-phase cycling on the plurality of precoder cycling types; and
identify each of the plurality of RBs for at least one of a single RB or multiple RBs level cycling period or granularity of the beam cycling based on the plurality of precoder cycling types, and
wherein each of the plurality of the co-phases being cycled across each of the identified plurality of REs and each of the plurality of beams being cycled across each of plurality of the RBs.

10. The eNB of claim 9, wherein the co-phase cycling comprises at least one set of co-phase values $$\left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\}$$

for a rank 1 transmission or one set of co-phase values $$\left\{ \begin{bmatrix} 1 & 1 \\ 1 & -1 \end{bmatrix}, \begin{bmatrix} 1 & 1 \\ j & -j \end{bmatrix} \right\}$$

for s rank 2 transmission that are cycled across the plurality of REs in at least one RB of the plurality of RBs,
wherein the beam cycling comprises the plurality of beams that is cycled across at least one RB of the plurality of RBs, and
wherein the beam cycling is achieved in a single beam for rank 1 transmission or in a pair of beams for rank 2 transmission on the at least one RB of the plurality of RBs.

11. The eNB of claim 9, wherein the co-phase cycling comprises at least two sets of co-phase values $$\left\{ \begin{bmatrix} 1 \\ 1 \end{bmatrix}, \begin{bmatrix} 1 \\ -1 \end{bmatrix} \right\} \text{ and } \left\{ \begin{bmatrix} 1 \\ j \end{bmatrix}, \begin{bmatrix} 1 \\ -j \end{bmatrix} \right\}$$

for a rank 1 transmission or two sets of co-phase values $$\left\{ \begin{bmatrix} 1 & 1 \\ 1 & -1 \end{bmatrix} \right\} \text{ and } \left\{ \begin{bmatrix} 1 & 1 \\ j & -j \end{bmatrix} \right\}$$

for a rank 2 transmission that are cycled across the plurality of REs in at least two consecutive RBs of the plurality of RBs,
wherein the beam cycling comprises the plurality of beams that is cycled across at least two consecutive RBs of the plurality of RBs, and
wherein the beam cycling is achieved in a single beam for rank 1 transmission or in a pair of beams for rank 2 transmission on the at least two consecutive RBs of the plurality of RBs.

12. The eNB of claim 8, wherein the at least one processor is further configured to:
identify a number of demodulation reference signal (DMRS) sequences based on the plurality of precoder cycling types including the at least one of the beam cycling or the co-phase cycling;
identify a physical resource block (PRB) bundling in accordance with the number of DMRS sequences for DMRS channel estimation; and
determine a number of the PRBs to be bundled based on the number of DMRS sequences.

13. The eNB of claim 12, wherein the PRB bundling for the DMRS channel estimation is configured by at least one of a radio resource control (RRC) signal received from the eNB or a pre-determined value.

14. The eNB of claim 8, wherein:
the transceiver is further configured to transmit channel state information (CSI) including the plurality of beams for the semi-open-loop PDSCH data transmission; and
the co-phase cycling comprises at least one of:
  a cycling period, or
  a granularity from at least one of a plurality of cycling periods or granularities including at least one of a single resource element (RE), a single RB, multiple REs, or multiple RBs.

15. A method for user equipment (UE) in a wireless communication network, the method comprising:
- identifying a plurality of beams for a semi-open-loop physical downlink shared channel (PDSCH) data transmission based on at least one of a plurality of precoder cycling types, wherein a precoder comprises a beam and a co-phase, and the plurality of precoder cycling types including at least one of a beam cycling from the plurality of beams or a co-phase cycling from a plurality of co-phases; and
- receiving PDSCH data through the semi-open-loop PDSCH data transmission according to the at least one of the plurality of precoder cycling types,
- wherein the plurality of precoder cycling types is cycled across a plurality of resource blocks (RBs) using the at least one of the beam cycling or the co-phase cycling.

16. The method of claim 15, further comprising:
- identifying a plurality of resource elements (REs) included in the plurality of RBs;
- identifying each of the plurality of REs for at least one of a single RE or multiple REs level cycling period or granularity of the co-phase cycling on the plurality of precoder cycling types; and
- identifying each of the plurality of RBs for at least one of a single RB or multiple RBs level cycling period or granularity of the beam cycling based on the plurality of precoder cycling types, wherein
- each of the plurality of the co-phases being cycled across each of the identified plurality of REs and each of the plurality of the beams being cycled across each of plurality of the RBs.

17. The method of claim 16, wherein the co-phase cycling comprises at least one set of co-phase values $$\left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\}$$

for a rank 1 transmission or one set of co-phase values $$\left\{ \begin{bmatrix} 1 & 1 \\ 1 & -1 \end{bmatrix}, \begin{bmatrix} 1 & 1 \\ j & -j \end{bmatrix} \right\}$$

for s rank 2 transmission that are cycled across the plurality of REs in at least one RB of the plurality of RBs,
- wherein the beam cycling comprises the plurality of beams that is cycled across at least one RB of the plurality of RBs, and
- wherein the beam cycling is achieved in a single beam for rank 1 transmission or in a pair of beams for rank 2 transmission on the at least one RB of the plurality of RBs.

18. The method of claim 16, wherein the co-phase cycling comprises at least two sets of co-phase values $$\left\{ \begin{bmatrix} 1 \\ 1 \end{bmatrix}, \begin{bmatrix} 1 \\ -1 \end{bmatrix} \right\} \text{ and } \left\{ \begin{bmatrix} 1 \\ j \end{bmatrix}, \begin{bmatrix} 1 \\ -j \end{bmatrix} \right\}$$

for a rank 1 transmission or two sets of co-phase values $$\left\{ \begin{bmatrix} 1 & 1 \\ 1 & -1 \end{bmatrix} \right\} \text{ and } \left\{ \begin{bmatrix} 1 & 1 \\ j & -j \end{bmatrix} \right\}$$

for a rank 2 transmission that are cycled across the plurality of REs in at least two consecutive RBs of the plurality of RBs,
- wherein the beam cycling comprises the plurality of beams that is cycled across at least two consecutive RBs of the plurality of RBs, and
- wherein the beam cycling is achieved in a single beam for rank 1 transmission or in a pair of beams for rank 2 transmission on the at least two consecutive RBs of the plurality of RBs.

19. The method of claim 15, further comprising:
- identifying a number of demodulation reference signal (DMRS) sequences based on the plurality of precoder cycling types including the at least one of the beam cycling or the co-phase cycling;
- identifying a physical resource block (PRB) bundling in accordance with the number of DMRS sequences for DMRS channel estimation; and
- determining a number of the PRBs to be bundled based on the number of DMRS sequences.

20. The method of claim 19, wherein the PRB bundling for the DMRS channel estimation is configured by at least one of a radio resource control (RRC) signal received from an eNodeB (eNB) or a pre-determined value.

* * * * *